United States Patent
Baek et al.

(10) Patent No.: US 12,478,922 B2
(45) Date of Patent: Nov. 25, 2025

(54) CATALYTIC DECOMPOSITION DEVICE AND INTEGRATED WASTE GAS TREATMENT SYSTEM

(71) Applicant: SAMSUNG ELECTRONICS CO., LTD., Suwon-si (KR)

(72) Inventors: Kyeongmin Baek, Hwaseong-si (KR); Sungmin Jang, Suwon-si (KR); Seongkeun Kang, Hwaseong-si (KR); Taehyun Kim, Asan-si (KR); Seongyun Ryu, Asan-si (KR); Byungku Yoo, Hwaseong-si (KR); Seungjun Lee, Hwaseong-si (KR); Woosung Choi, Goyang-si (KR); Haeyong Choi, Yongin-si (KR); Joungwoo Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 486 days.

(21) Appl. No.: 18/046,495

(22) Filed: Oct. 13, 2022

(65) Prior Publication Data
US 2023/0158453 A1    May 25, 2023

(30) Foreign Application Priority Data
Nov. 24, 2021    (KR) .................. 10-2021-0163467

(51) Int. Cl.
*B01D 53/86* (2006.01)
*B01D 53/06* (2006.01)
(Continued)

(52) U.S. Cl.
CPC ......... *B01D 53/8631* (2013.01); *B01D 53/72* (2013.01); *B01D 53/75* (2013.01);
(Continued)

(58) Field of Classification Search
None
See application file for complete search history.

(56) References Cited

U.S. PATENT DOCUMENTS 4,238,455 A * 12/1980 Ogiwara .................. F23J 15/02
422/177
6,391,077 B1    5/2002 Kudoh
(Continued)

FOREIGN PATENT DOCUMENTS

| JP | 20070152204 | 6/2007 |
|---|---|---|
| JP | 4992586 | 5/2012 |

(Continued)

OTHER PUBLICATIONS

WO2020204265A1_ENG (Espacent machine translation of Choi) (Year: 2020).*
(Continued)

*Primary Examiner* — Gabriel E Gitman
(74) *Attorney, Agent, or Firm* — MORGAN, LEWIS & BOCKIUS LLP

(57) ABSTRACT

An integrated waste gas treatment system includes an adsorption/desorption device that receives a waste gas that includes an organic compound and an organic nitrogen compound exhausted from a semiconductor manufacturing facility, where the adsorption/desorption device adsorbs the organic compound and the organic nitrogen compound and concentrates and desorbs the organic compound and the organic nitrogen compound, and a catalytic decomposition device disposed adjacent to the adsorption/desorption device, where the catalytic decomposition device includes a catalytic chamber that provides a gas passage through which a gas desorbed from the adsorption/desorption device flows and an oxidation-reduction catalyst disposed in the gas passage that removes the organic compound and the organic nitrogen compound from the desorbed gas. The organic (Continued)

compound and the organic nitrogen compound are subjected to an oxidation treatment by the oxidation-reduction catalyst, and nitrogen oxides generated by the oxidation treatment are removed by a selective reduction reaction.

20 Claims, 19 Drawing Sheets

(51) Int. Cl.
    *B01D 53/72*     (2006.01)
    *B01D 53/75*     (2006.01)
    *B01D 53/88*     (2006.01)
    *B01J 35/56*     (2024.01)
    *B01D 53/04*     (2006.01)
    *B01D 53/83*     (2006.01)
    *B01J 23/89*     (2006.01)

(52) U.S. Cl.
    CPC ..... *B01D 53/8634* (2013.01); *B01D 53/8668* (2013.01); *B01D 53/88* (2013.01); *B01J 35/56* (2024.01); *B01D 53/0407* (2013.01); *B01D 53/0462* (2013.01); *B01D 53/06* (2013.01); *B01D 53/83* (2013.01); *B01D 53/8621* (2013.01); *B01D 53/8628* (2013.01); *B01D 2253/102* (2013.01); *B01D 2253/104* (2013.01); *B01D 2253/108* (2013.01); *B01D 2253/3425* (2013.01); *B01D 2255/9022* (2013.01); *B01D 2257/40* (2013.01); *B01D 2257/406* (2013.01); *B01D 2257/708* (2013.01); *B01D 2258/0216* (2013.01); *B01J 23/89* (2013.01)

(56) References Cited

U.S. PATENT DOCUMENTS

| | | | |
|---|---|---|---|
| 8,575,054 | B2 | 11/2013 | Ikoma et al. |
| 9,278,343 | B2 | 3/2016 | Green et al. |
| 10,518,217 | B2 | 12/2019 | Yokoyama et al. |
| 2003/0235524 | A1* | 12/2003 | Koike ............ B01D 53/74 422/177 |
| 2007/0154377 | A1* | 7/2007 | Rekers ............ B01D 53/8668 423/245.3 |
| 2020/0309007 | A1 | 10/2020 | Kilmartin et al. |

FOREIGN PATENT DOCUMENTS

| | | | |
|---|---|---|---|
| JP | 6442426 | 11/2018 | |
| JP | 6875428 | 4/2021 | |
| KR | 10-1126063 | 3/2012 | |
| KR | 10-1250940 | 3/2013 | |
| KR | 10-1309714 | 9/2013 | |
| KR | 10-142367 8 | 7/2014 | |
| KR | 10-1542177 | 7/2015 | |
| KR | 10-1582964 | 12/2015 | |
| KR | 10-1598196 | 2/2016 | |
| KR | 10-1854167 | 4/2018 | |
| KR | 10-1903046 | 9/2018 | |
| KR | 10-1971176 | 4/2019 | |
| KR | 10-2063953 | 1/2020 | |
| KR | 10-2154367 | 9/2020 | |
| KR | 10-2259868 | 6/2021 | |
| WO | WO-2020204265 A1 * | 10/2020 | .............. B01J 23/42 |

OTHER PUBLICATIONS

Yu-Hwan Kim, et al., "Characteristics of alumina prepared by hydrolysis of Al-Alkoxide," Journal of the Korean Ceramic Society, vol. 33, No. 3, pp. 348-356, 1996.

Min-Whee Cho, et al. "Toluene adsorption characteristics of zeolite depending on temperature and relative humidity." J. Odor Indoor Environment, vol. 15, No. 4, pp. 368-374, Dec. 2016.

* cited by examiner

CATALYTIC DECOMPOSITION DEVICE AND INTEGRATED WASTE GAS TREATMENT SYSTEM

CROSS REFERENCE TO RELATED APPLICATION(S)

This application claims priority under 35 U.S.C. § 119 from Korean Patent Application No. 10-2021-0163467, filed on Nov. 24, 2021 in the Korean Intellectual Property Office (KIPO), the contents of which are herein incorporated by reference in their entirety.

TECHNICAL FIELD

Embodiments are directed to a catalytic decomposition device and an integrated waste gas treatment system. More particularly, embodiments are directed to a catalytic decomposition device that purifies a waste gas generated from a semiconductor manufacturing facility and an integrated waste gas treatment system including the same.

DISCUSSION OF THE RELATED ART

Waste gas generated from a semiconductor manufacturing facility typically includes organic compounds and organic nitrogen compounds. The organic compounds, such as isopropyl alcohol, are not present in a high concentration but have a large amount of exhaust, so they are removed through an oxidation treatment by direct combustion, such as a regenerative thermal oxidation (RTO) after a concentration treatment using zeolite. In addition, the organic nitrogen compounds, such as ammonia, are removed through a wet treatment using sulfuric acid. However, for the organic compounds, energy consumption due to direct combustion is large, and in the case of ammonia, wastewater is generated by the wet treatment. In addition, since each of the different compounds is removed by an individual treatment, the area of a treatment site increases and facility management is challenging.

On the other hand, when purifying the waste gas using a catalyst, since an operator enters the facility and maintains the catalyst, securing the safety of the operation is challenging.

SUMMARY

Embodiments provide a catalytic decomposition device that can simultaneously purify organic compounds and organic nitrogen compounds and ensuring work stability.

Embodiments provide an integrated waste gas treatment system that includes a catalytic decomposition device.

According to embodiments, an integrated waste gas treatment system includes an adsorption/desorption device that receives a waste gas that includes an organic compound and an organic nitrogen compound exhausted from a semiconductor manufacturing facility, where the adsorption/desorption device adsorbs the organic compound and the organic nitrogen compound and concentrates and desorbs the organic compound and the organic nitrogen compound, and a catalytic decomposition device disposed adjacent to the adsorption/desorption device, where the catalytic decomposition device includes a catalytic chamber that provides a gas passage through which a gas desorbed from the adsorption/desorption device flows and an oxidation-reduction catalyst disposed in the gas passage that removes the organic compound and the organic nitrogen compound from the desorbed gas. The organic compound and the organic nitrogen compound are subjected to an oxidation treatment by the oxidation-reduction catalyst, and nitrogen oxides (NOx) generated by the oxidation treatment are removed by a selective reduction reaction.

According to embodiments, a catalytic decomposition device includes a frame structure that includes a first space in a lower level of the frame structure and a second space in an upper level of the frame structure, a catalytic chamber installed in the second space of the frame structure and that includes a gas passage through which flows a waste gas that includes an organic compound and an organic nitrogen compound exhausted from a semiconductor manufacturing facility, a catalyst bed disposed in the gas passage of the catalytic chamber and that includes a plurality of catalyst blocks assembled into a lattice pattern, where an oxidation-reduction catalyst that removes the organic compound and the organic nitrogen compound from the waste gas is provided in each of the plurality of catalyst blocks, and a lifting device that moves the catalyst bed from the catalytic chamber to the first space under the catalytic chamber.

According to embodiments, an integrated waste gas treatment system includes an adsorption/desorption device and a catalytic decomposition device that are sequentially installed in an exhaust line through which a waste gas that includes an organic compound and an organic nitrogen compound is exhausted from a semiconductor manufacturing facility. The adsorption/desorption device includes a rotor-type concentrator that includes an adsorption zone, a desorption zone and a cooling zone. The rotor-type concentrator is rotatable at a predetermined rotational speed by a driving motor and adsorbs the organic compound and the organic nitrogen compound of the waste gas received through the adsorption zone. The adsorption/desorption device also includes a desorbing portion that desorbs the organic compound and the organic nitrogen compound adsorbed to the concentrator with a carrier gas. The catalytic decomposition device includes a frame structure that includes a first space in a lower level of the frame structure and a second space in an upper level of the frame structure, a catalytic chamber installed in the second space of the frame structure and that includes a gas passage through which flows the gas desorbed by the desorbing portion, a catalyst bed disposed in the gas passage of the catalytic chamber and that includes a plurality of catalyst blocks assembled into a lattice pattern, an oxidation-reduction catalyst provided in each of the plurality of catalyst blocks that removes the organic compound and the organic nitrogen compound from the desorbed gas and outputs a purified gas, and a lifting device that moves the catalyst bed from the catalytic chamber to the first space under the catalytic chamber.

DETAILED DESCRIPTION OF EMBODIMENTS

Hereinafter, embodiments will be described in detail with reference to the accompanying drawings.

Figure 1:
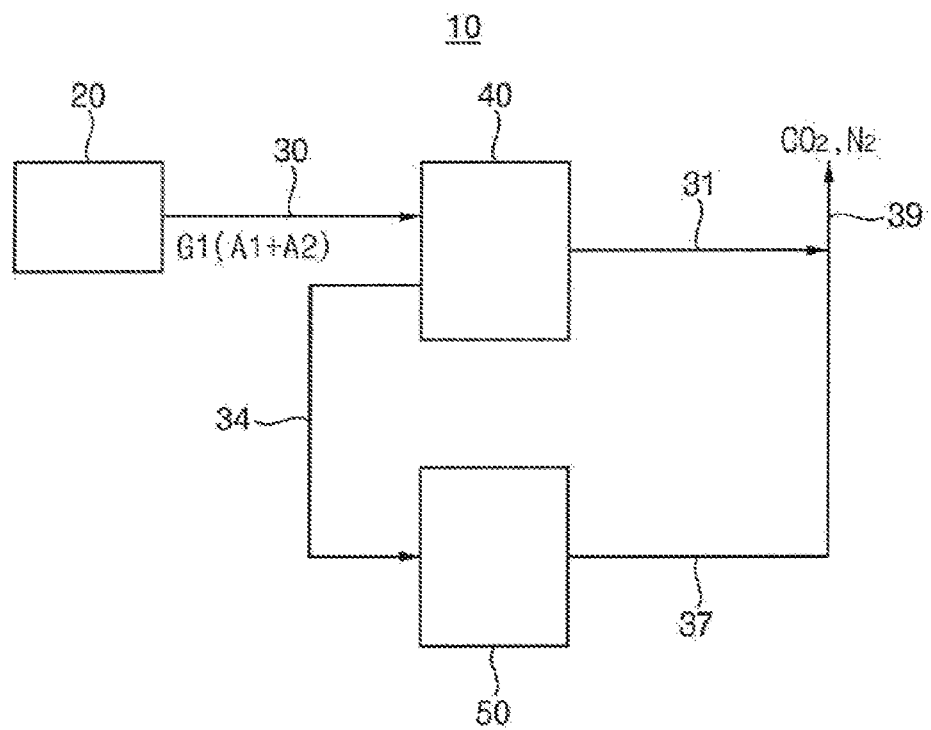
FIG. 1 is a block diagram of an integrated waste gas treatment system in accordance with embodiments.
Figure 2:
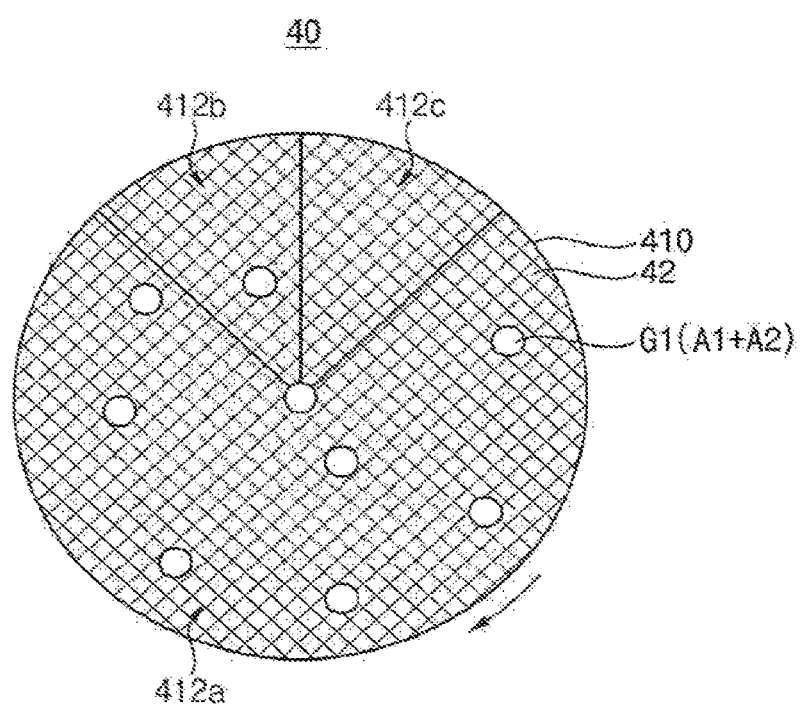
FIG. 2 is a cross-sectional view of an adsorption/desorption device of an integrated waste gas treatment system of FIG. 1.
Figure 3A:
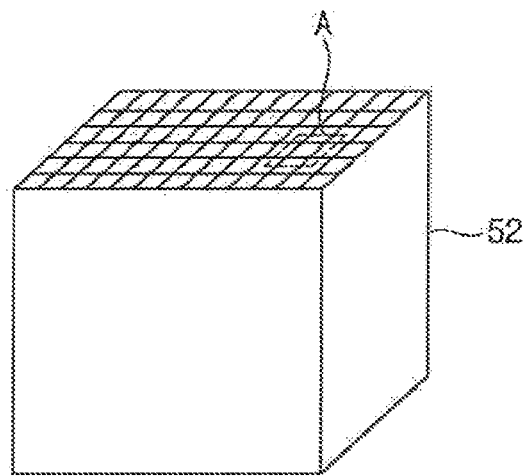
FIG. 3A is a perspective view of a catalytic decomposition device of a integrated waste gas treatment system of FIG. 1.
Figure 3B:
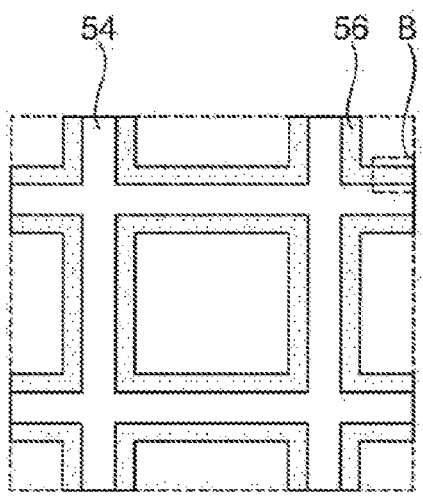
FIG. 3B is a cross-sectional view of portion 'A' in FIG. 3A.
Figure 3C:
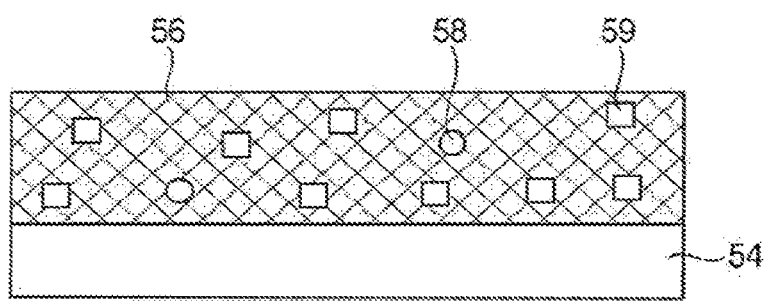
FIG. 3C is a cross-sectional view of portion 'B' in FIG. 3B.
Figure 4:
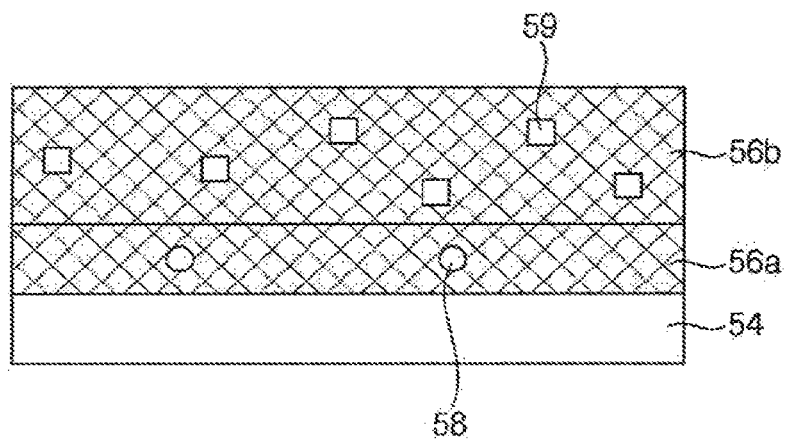
FIG. 4 is a cross-sectional view of portion 'B' in FIG. 3B according to an embodiment.
Figure 5:
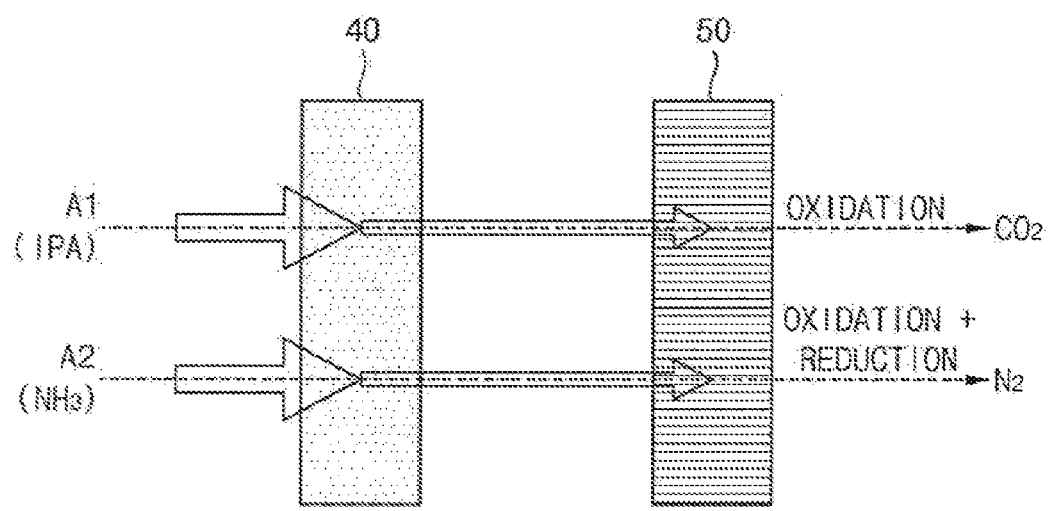
FIG. 5 illustrates simultaneous treatment of first and second compounds by an adsorption/desorption device and a catalytic decomposition device of FIG. 1.

FIG. 1 is a block diagram of an integrated waste gas treatment system in accordance with embodiments. FIG. 2 is a cross-sectional view of an adsorption/desorption device of an integrated waste gas treatment system of FIG. 1. FIG. 3A is a perspective view of a catalytic decomposition device of an integrated waste gas treatment system of FIG. 1. FIG. 3B is a cross-sectional view of portion 'A' in FIG. 3A. FIG. 3C is a cross-sectional view of portion 'B' in FIG. 3B. FIG. 4 is a cross-sectional view of portion 'B' in FIG. 3B according to another embodiment. FIG. 5 illustrates simultaneous treatment of first and second compounds by an adsorption/desorption device and the catalytic decomposition device of FIG. 1.

Referring to FIGS. 1 to 5, in an embodiment, an integrated waste gas treatment system 10 includes an adsorption/desorption device 40 and a catalytic decomposition device 50 that are configured to simultaneously purify a waste gas G1 that includes first and second compounds A1 and A2 discharged from an emission source 20.

In embodiments, the integrated waste gas treatment system 10 is a waste gas treatment system that is installed in an exhaust line which is connected to the emission source 20 such as a semiconductor manufacturing facility and through which the waste gas is discharged, and that can simultaneously purify an organic compound such as the first compound A1 and an organic nitrogen compound such as the second compound A2 in the waste gas.

For example, a semiconductor manufacturing facility discharges a waste gas that includes an organic compound and an organic nitrogen compound. The waste gas treatment system is installed on a site such as a rooftop of a semiconductor manufacturing facility to simultaneously remove the organic compound and the organic nitrogen compound from the discharged waste gas and discharge the purified gas into the atmosphere. The organic compound may include volatile organic compounds (VOC) such as isopropyl alcohol (IPA), and the organic nitrogen compound may include ammonia ($NH_3$).

In embodiments, the adsorption/desorption device 40 adsorbs the first and second compounds A1 and A2 of the waste gas G1 received at the same time from the emission source 20 through a first exhaust line 30 connected to the emission source 20 and discharges the purified gas and concentrates and desorbs the first and second compounds A1 and A2.

As illustrated in FIG. 2, in an embodiment, the adsorption/desorption device 40 includes a rotor-type concentrator 410. The concentrator 410 is divided into three regions, an adsorption zone 412a, a desorption zone 412b and a cooling zone 412c. A rotational speed of the rotor-type concentrator 410 is adjusted to within a range of 2 rph to 20 rph according to a concentration of the introduced compound.

The concentrator 410 includes a honeycomb-type support 42 inside a cylindrical rotor through which the waste gas passes and an adsorption layer coated on a surface of the support 42. The adsorption layer includes at least one of zeolite, alumina ($Al_2O_3$), porous silica ($SiO_2$), a carbon-based adsorbent, etc. The material of the adsorption layer may be doped with a heterogeneous element.

The waste gas G1 generated from the emission source 20 is introduced into the adsorption/desorption device 40 through the first exhaust line 30 connected to the emission source 20. The waste gas G1 introduced into the adsorption/desorption device 40 passes through the adsorption zone 412a of the support 42 of the concentrator 410, and the first compound A1 and the second compound A2 in the waste gas are adsorbed in the adsorption layer on the surface of the support and the waste gas purified by the adsorption layer is discharged through a second exhaust line 31.

The portion of the adsorption layer in which the first and second compounds A1 and A2 are concentrated moves to the desorption zone 412b by the rotation of the rotor, and a carrier gas for desorption passes the desorption layer of the desorption zone 412b of the concentrator 410 to desorb the first and second compounds A1 and A2 adsorbed in the portion of the adsorption layer. The waste gas from which the first and second compounds A1 and A2 are desorbed is introduced into the catalytic decomposition device 50 through a third exhaust line 34 connected to the adsorption/desorption device 40.

The portion of the adsorption layer moves to the cooling zone 412c by the rotation of the rotor and is cooled, and moves back to the adsorption zone 412a to further purify the waste gas, and the purified waste gas is discharged through the second exhaust line 31.

In embodiments, the catalytic decomposition device 50 simultaneously decomposes the waste gas received from the adsorption/desorption device 40 through the third exhaust line 34. For example, the catalytic decomposition device 50 simultaneously decomposes the first and second compounds A1, A2 of the desorbed gas through a catalytic reaction.

Referring to FIGS. 3A to 3C, in an embodiment, the catalytic decomposition device 50 includes a catalytic chamber that includes a gas passage through which the introduced waste gas flows, and an oxidation-reduction catalyst 52 installed in the gas passage of the catalytic chamber. For example, the oxidation-reduction catalyst includes an ammonia oxidation catalyst (AOC). The oxidation-reduction catalyst 52 further includes a catalyst body 54 installed in the gas passage and that includes a plurality of passages through which the waste gas flows, and a carrier 56 coated on the catalyst body 54 and that includes first and second catalytic materials 58 and 59.

The catalyst body 54 includes, for example, silicon carbide (SiC) or cordierite, etc. The catalyst body 54 is formed in a metal foam shape that includes many pores. The oxidation-reduction catalyst 52 may include a single catalyst body that has the same composition and structure, or may include two or more catalyst bodies having different compositions and structures.

The carrier 56 includes a porous material such as zeolite, alumina, silica, or a carbon-based material, etc. The carrier 56 includes 5 wt % or less of the first catalytic material 58 and 30 wt % or less of the second catalytic material 59 based on the total weight. For example, the first catalytic material 58 includes a noble metal such as platinum (Pt), palladium (Pd), rhodium (Rh), iridium (Ir), ruthenium (Ru), silver (Ag), or gold (Au), etc., and the second catalytic material 59 includes a transition metal such as copper (Cu), iron (Fe), cerium (Ce), cobalt (Co), zinc (Zn), zirconium (Zr), manganese (Mn), vanadium (V), titanium (Ti), nickel (Ni), chromium (Cr), or molybdenum (Mo), etc.

In an embodiment, the oxidation-reduction catalyst 52 is formed by coating a base material with a catalyst layer in which the first catalytic material 58 and the second catalytic material 59 have been simultaneously impregnated with a metal carrier. Alternatively, in an embodiment, the oxidation-reduction catalyst 52 includes the single-layered carrier 56 formed by coating a substrate with a catalytic material in which are physically mixed a first catalyst layer impregnated with the first catalytic material 58 and a second catalyst layer impregnated with the second catalytic material 59.

For another example, as illustrated in FIG. 4, in an embodiment, the oxidation-reduction catalyst 52 includes first and second carrier layers 56a and 56b sequentially stacked on a catalyst body 54. The first carrier layer 56a includes a first catalytic material 58, and the second carrier layer 56b includes a second catalytic material 59. The oxidation-reduction catalyst 52 includes a multi-layered carrier formed by coating a substrate with a first catalyst layer impregnated with a first catalytic material 58 and then coating a second catalyst layer impregnated with a second metal material 59 on the first catalyst layer.

As illustrated in FIG. 5, in an embodiment, the adsorption/desorption device 40 simultaneously concentrates and desorbs the organic compound as the first compound and ammonia ($NH_3$) as the second compound of the waste gas received from the emission source 20, and the catalytic decomposition device 50 is disposed at a rear end of the adsorption/desorption device 40 that oxidizes and converts the organic compound received from the adsorption/desorption device 40 into carbon dioxide ($CO_2$), and that oxidizes and reduces the desorbed ammonia ($NH_3$) into nitrogen ($N_2$), to purify the waste gas.

The first catalytic material, such as Pt, of the catalytic decomposition device 50 purifies the organic compound, such as IPA (isopropyl alcohol), into carbon dioxide ($CO_2$) by an oxidation catalyst function under conditions of the organic compound, such as IPA, and oxygen ($O_2$) as shown in Reaction Formula (1) below.

$$2C_3H_8O + 9O_2 \rightarrow 6CO_2 + 8H_2O \quad \text{Reaction Formula (1)}$$

The first catalytic material, such as Pt, of the catalytic decomposition device 50 purifies ammonia ($NH_3$) into nitrogen ($N_2$), or generates nitrogen oxides (NOx) by an oxidation catalyst function under conditions of the organic nitrogen compound, such as ammonia, and oxygen ($O_2$) conditions as shown in Reaction Formulas (2) to (4) below.

$$4NH_3 + 3O_2 \rightarrow 2N_2 + 6H_2O \quad \text{Reaction Formula (2)}$$

$$4NH_3 + 5O_2 \rightarrow 4NO + 6H_2O \quad \text{Reaction Formula (3)}$$

$$4NH_3 + 7O_2 \rightarrow 4NO_2 + 6H_2O \quad \text{Reaction Formula (4)}$$

The second catalytic material, such as Cu, of the catalytic decomposition device 50 purifies nitrogen oxide (NOx) into nitrogen ($N_2$) by a reduction catalyst function under conditions of ammonia ($NH_3$), nitrogen oxide (NOx) and oxygen ($O_2$) as shown in Reaction Formulas (5) and (6) below.

$$4NH_3 + 4NO + O_2 \rightarrow 4N_2 + 6H_2O \quad \text{Reaction Formula (5)}$$

$$2NH_3 + NO + NO_2 \rightarrow 2N_2 + 3H_2O \quad \text{Reaction Formula (6)}$$

Referring back to FIG. 1, the waste gas purified by the catalytic decomposition device 50 is discharged through a fourth exhaust line 37. The second exhaust line 31 and the fourth exhaust line 37 are joined into a fifth exhaust line 39. Accordingly, the waste gas purified by the adsorption/desorption device 40 and the catalytic decomposition device 50 is discharged through the fifth exhaust line 39.

Table 1, below, shows compound gas concentrations (ppm) detected in exhaust lines of the integrated waste gas treatment system of FIG. 1.

TABLE 1

| Exhaust Line | First Exhaust Line (30) | Second Exhaust Line (31) | Third Exhaust Line (34) | Fourth Exhaust Line (37) | Fifth Exhaust Line (39) |
|---|---|---|---|---|---|
| $NH_3$ (ppm) | 185 | 2.3 | 1830 | 7 | 3 |
| IPA (ppm) | 148 | 1.4 | 1470 | 17 | 3.1 |
| NOx (ppm) | — | — | — | 12 | 1.2 |

Referring to Table 1, when the first catalytic material includes platinum (Pt) and the second catalytic material includes copper (Cu), all of the emission concentrations of ammonia ($NH_3$), IPA and nitrogen oxides (NOx) satisfy the legal standards. For example, the legal standard for nitrogen oxides (NOx) is 35 ppm or less.

In embodiments, the oxidation reaction rate of the volatile organic compound, such as IPA, and the organic nitrogen compound, such as ammonia ($NH_3$), is increased by the first catalytic material, such as Pt. Accordingly, the oxidation reaction temperature of IPA and ammonia ($NH_3$) can be lowered to a temperature of 400° C. to 500° C.

In addition, since the first catalytic material, such as Pt, and the second catalytic material, such as Cu, coexist on the same surface of the catalyst body of the catalytic decomposition device 50, the oxidation reaction and the reduction reaction in the catalytic decomposition device 50 of the organic nitrogen compound, such as ammonia ($NH_3$), occurs repeatedly at the same or a similar ratio. Accordingly, nitrogen oxides (NOx) generated by the oxidation reaction of ammonia ($NH_3$) are converted into nitrogen ($N_2$) and discharged by the reduction reaction that uses ammonia ($NH_3$) supplied after being desorbed.

Thus, since the oxidation reaction can be induced at a lower temperature than an oxidation reaction temperature of 800° C. or higher by a conventional thermal oxidizing method, such as a direct combustion method, fuel consumption for combustion can be reduced. Furthermore, the treatment cost of secondary products, such as nitrogen oxides (NOx) generated when ammonia ($NH_3$) is oxidized using a conventional general oxidation catalyst, can be reduced.

Hereinafter, detailed configurations of an adsorption/desorption device and a catalytic decomposition device of an integrated waste gas treatment system according to embodiments of the disclosure will be described in detail.

Figure 6:
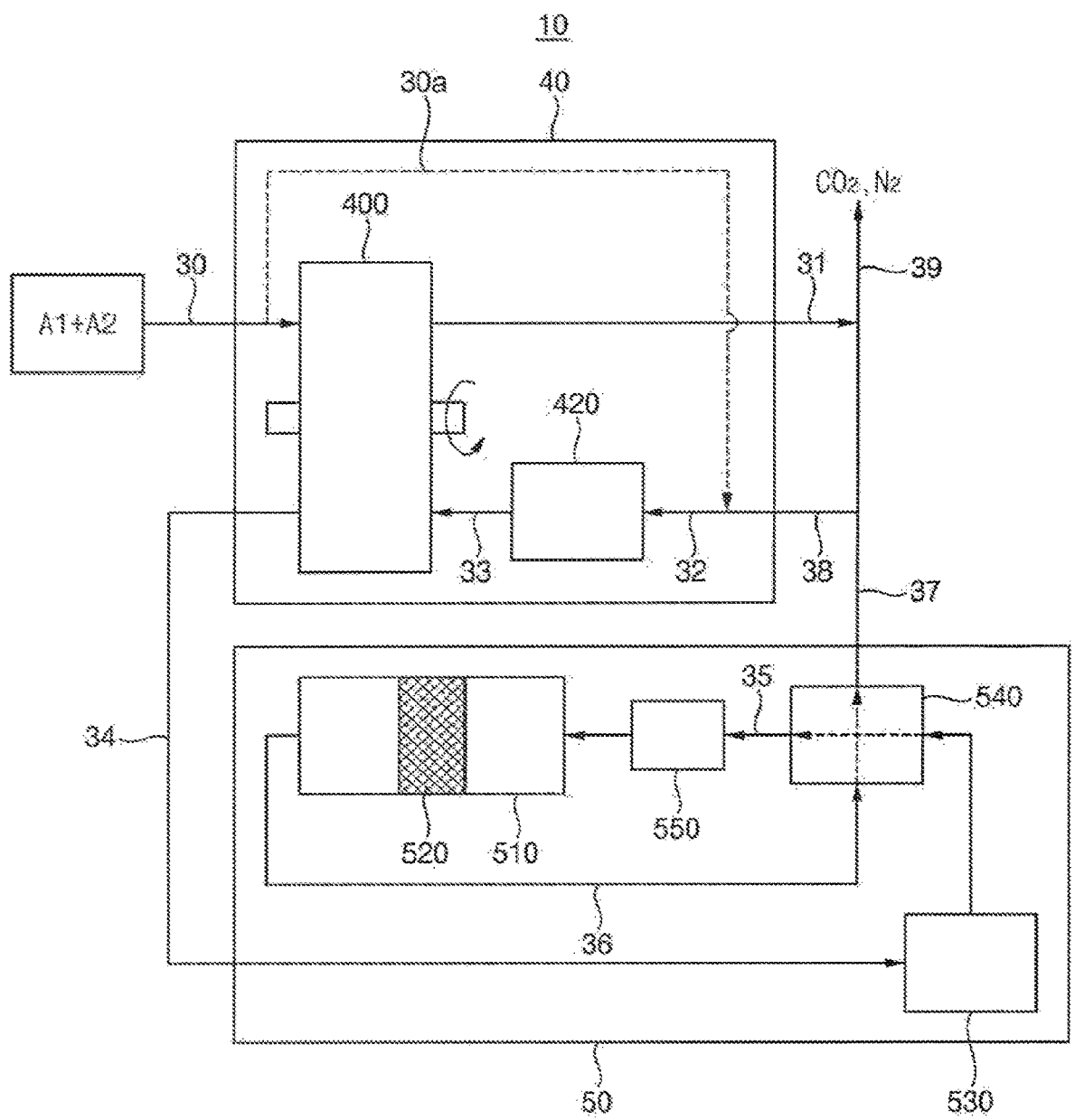
FIG. 6 is a block diagram of an integrated waste gas treatment system that includes an adsorption/desorption device and a catalytic decomposition device in accordance with embodiments.
Figure 7:
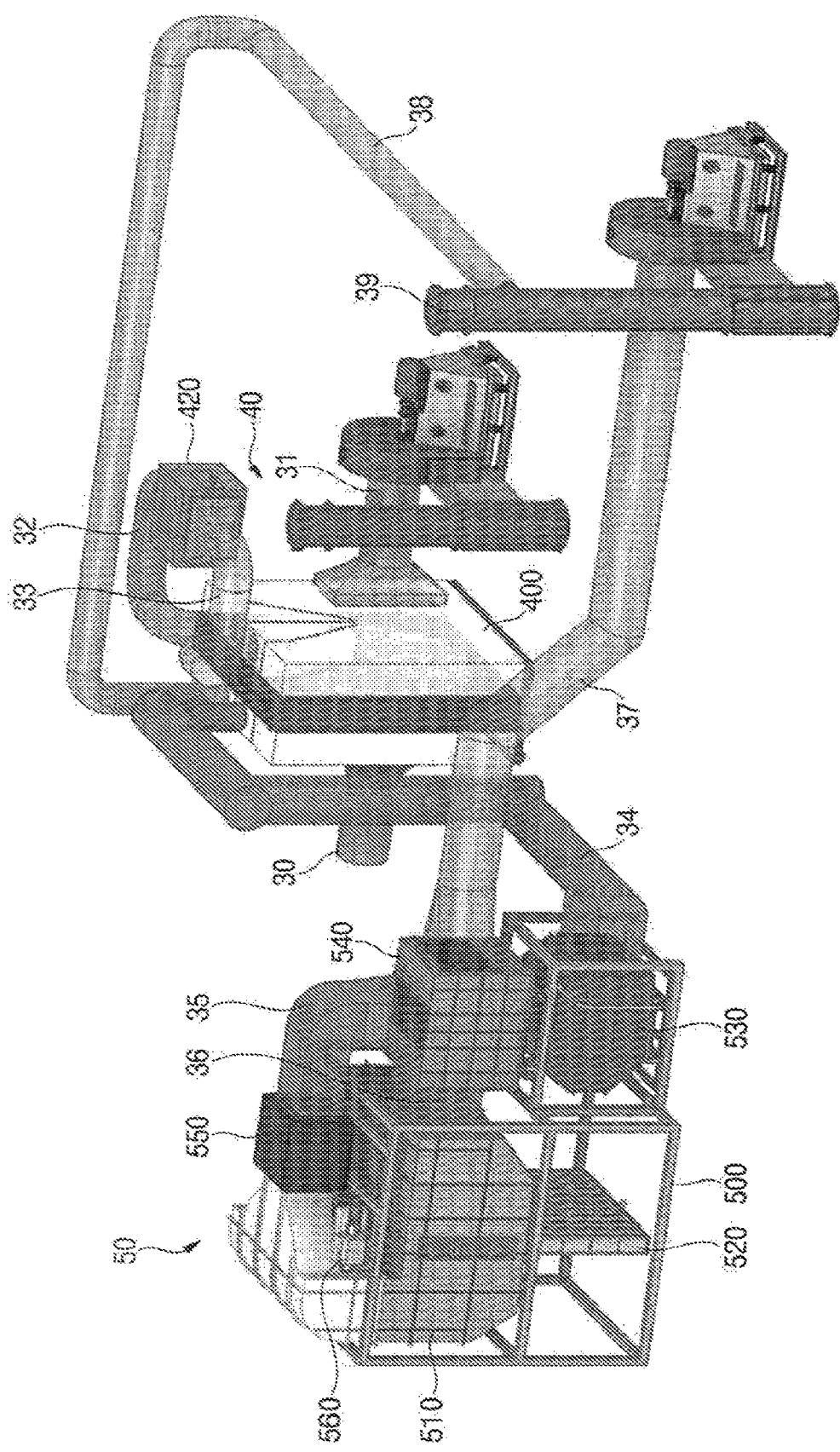
FIG. 7 is a perspective view of an integrated waste gas treatment system of FIG. 6 installed in a semiconductor manufacturing facility in accordance with embodiments.
Figure 8:
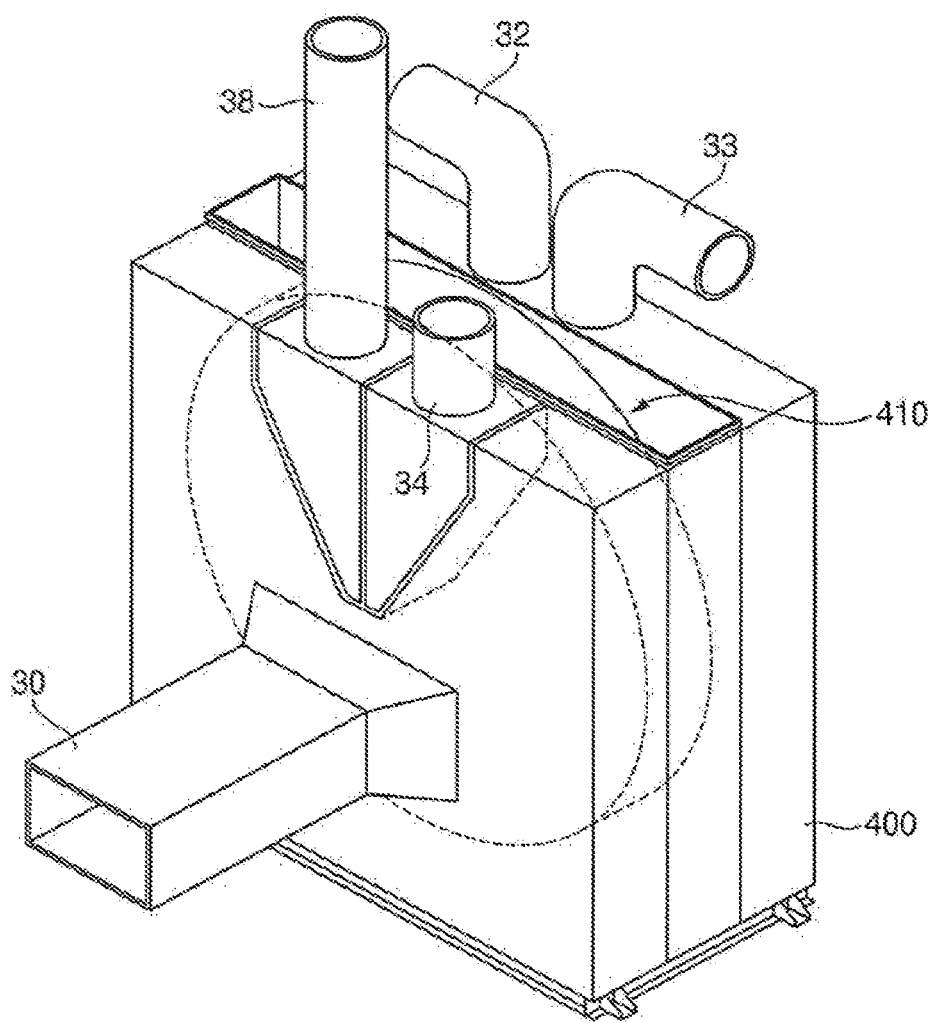
FIG. 8 is a perspective view of an adsorption/desorption device of FIG. 7.
Figure 9:
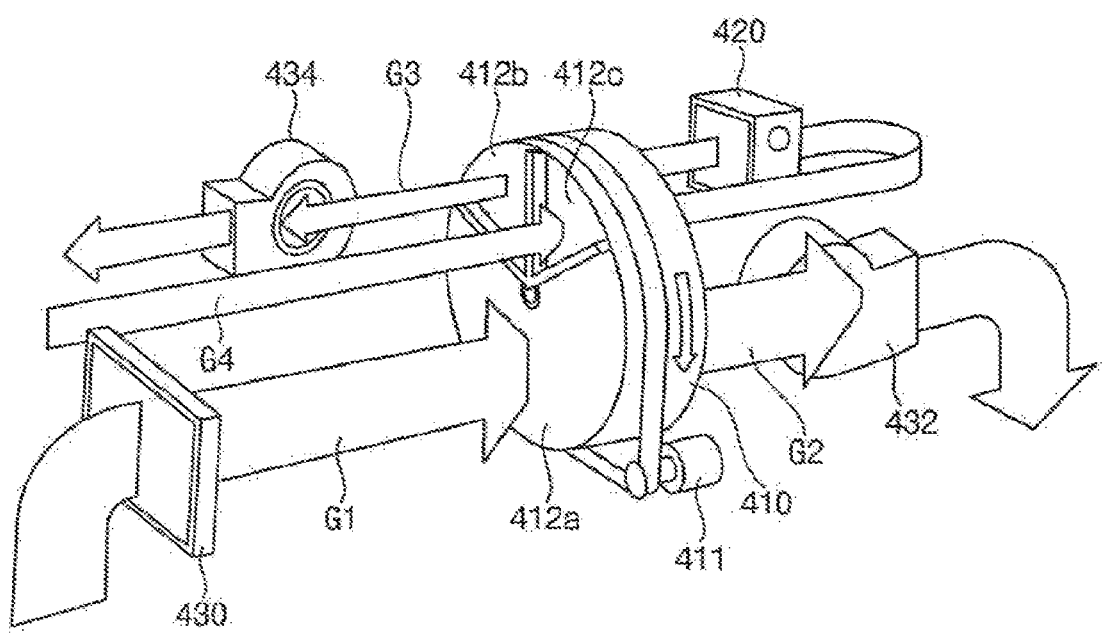
FIG. 9 illustrates the operation of an adsorption/desorption device of FIG. 8.

FIG. 6 is a block diagram of an integrated waste gas treatment system that includes an adsorption/desorption device and a catalytic decomposition device in accordance with embodiments. FIG. 7 is a perspective view of an integrated waste gas treatment system of FIG. 6 installed in a semiconductor manufacturing facility. FIG. 8 is a perspective view of an adsorption/desorption device in FIG. 7. FIG. 9 illustrates the operation of an adsorption/desorption device of FIG. 8.

Referring to FIGS. 6 to 9, in an embodiment, an integrated waste gas treatment system 10 includes an adsorption/desorption device 40 and a catalytic decomposition device 50 that are sequentially installed in an exhaust line through which the waste gas is discharged from an emission source 20. For example, the adsorption/desorption device 40 and the catalytic decomposition device 50 are installed on a site such as a rooftop of a semiconductor manufacturing facility to simultaneously remove organic compounds and organic nitrogen compounds from the exhausted waste gas and discharge the purified gas.

As illustrated in FIGS. 8 and 9, the adsorption/desorption device 40 includes a rotor-type concentrator 410 and a desorbing portion. Waste gas G1 received from a first exhaust line 30 from an emission source 20 is introduced into the rotor-type concentrator 410 that adsorbs and concentrates an organic compound A1 and ammonia A2 of the waste gas G1 and desorbs the concentrated organic compound A1 and ammonia A2. The desorbing portion desorbs the organic compound A1 and ammonia A2 adsorbed to the concentrator 410 with a carrier gas G4. The desorbing portion includes a heater 420 that heats the carrier gas G4 to a temperature suitable for desorption and an adsorption fan 434 that discharges the desorbed gas G3.

The rotor-type concentrator 410 has a cylindrical shape and is rotated by a driving motor 411 inside a housing 400 of the adsorption/desorption device 40. The rotor-type concentrator 410 includes three regions: an adsorption zone 412a, a desorption zone 412b and a cooling zone 412c. The rotor-type concentrator 410 is rotated at a predetermined rotation speed by the driving motor 411.

The rotor-type concentrator 410 includes a honeycomb-type support that extends about a rotational axis inside a cylindrically shaped rotor and an adsorption layer coated on a surface of the support. The adsorption layer includes at least one of zeolite, alumina ($Al_2O_3$), porous silica ($SiO_2$), or a carbon-based adsorbent, etc. The material of the adsorption layer may be doped with a heterogeneous element.

The waste gas G1 received from the emission source 20 is introduced into the adsorption/desorption device 40 through the first exhaust line 30. The waste gas G1 introduced into the adsorption/desorption device 40 passes through a filter 430, through the adsorption layer of the adsorption zone 412a of the concentrator 410, and the organic compound A1 and ammonia A2 in the waste gas are adsorbed into the adsorption layer to purify the waste gas, and the purified waste gas G2 is discharged through the second exhaust line 31. An exhaust fan 432 is installed in the second exhaust line 31, so that the purified air G2 can be discharged through the second exhaust line 31 and the fifth exhaust line 39.

A portion of the adsorption layer into which the organic compound A1 and ammonia A2 are adsorbed moves into the desorption zone 412b as the rotor rotates, and the carrier gas G4 passes through the adsorption layer in the desorption zone 412b of the concentrator 410 such that the organic compound A1 and ammonia A2 are desorbed and concentrated from the portion of the adsorption layer. For example, the concentration ratio is within a range of 3 to 30 times.

The desorption portion provides the carrier gas G4 that desorbs the adsorbed organic compound A1 and ammonia A2 through the desorption zone 412b and into the adsorption layer of the concentrator 410. A portion of the waste gas G1 or a portion of the gas purified by the catalytic decomposition device 50 may be used as a portion of the carrier gas G4. Alternatively, external air other than the waste gas may be used as at least a portion of the carrier gas.

In particular, a portion of the waste gas G1 is supplied through a first branch line 30a that branches from the first exhaust line 30 to a first purge line 32. A portion of the waste gas discharged from the catalytic decomposition device 50 is supplied through a second branch line 38 branched from the fourth exhaust line 37 to the first purge line 32. The carrier gas G4 supplied to the first purge line 32 is heated to from about 50° C. to about 350° C. by the heater 420, and the heated carrier gas G4 is supplied through a second purge line 33 to the desorption zone 412b to desorb the organic compound A1 and ammonia A2. The desorbed gas G3 includes the organic compound A1 and ammonia A2 and is introduced through the third exhaust line 34 into the catalytic decomposition device 50 by the adsorption fan 434.

The adsorption layer portion moves to the cooling zone 412c by rotation of the rotor to be cooled, and moves to the adsorption zone 412a again to purify the waste gas, and the purified waste gas discharged through the second exhaust line 31.

Hereinafter, a catalytic decomposition device of an integrated waste gas treatment system of FIG. 6 will be described in detail.

Figure 10:
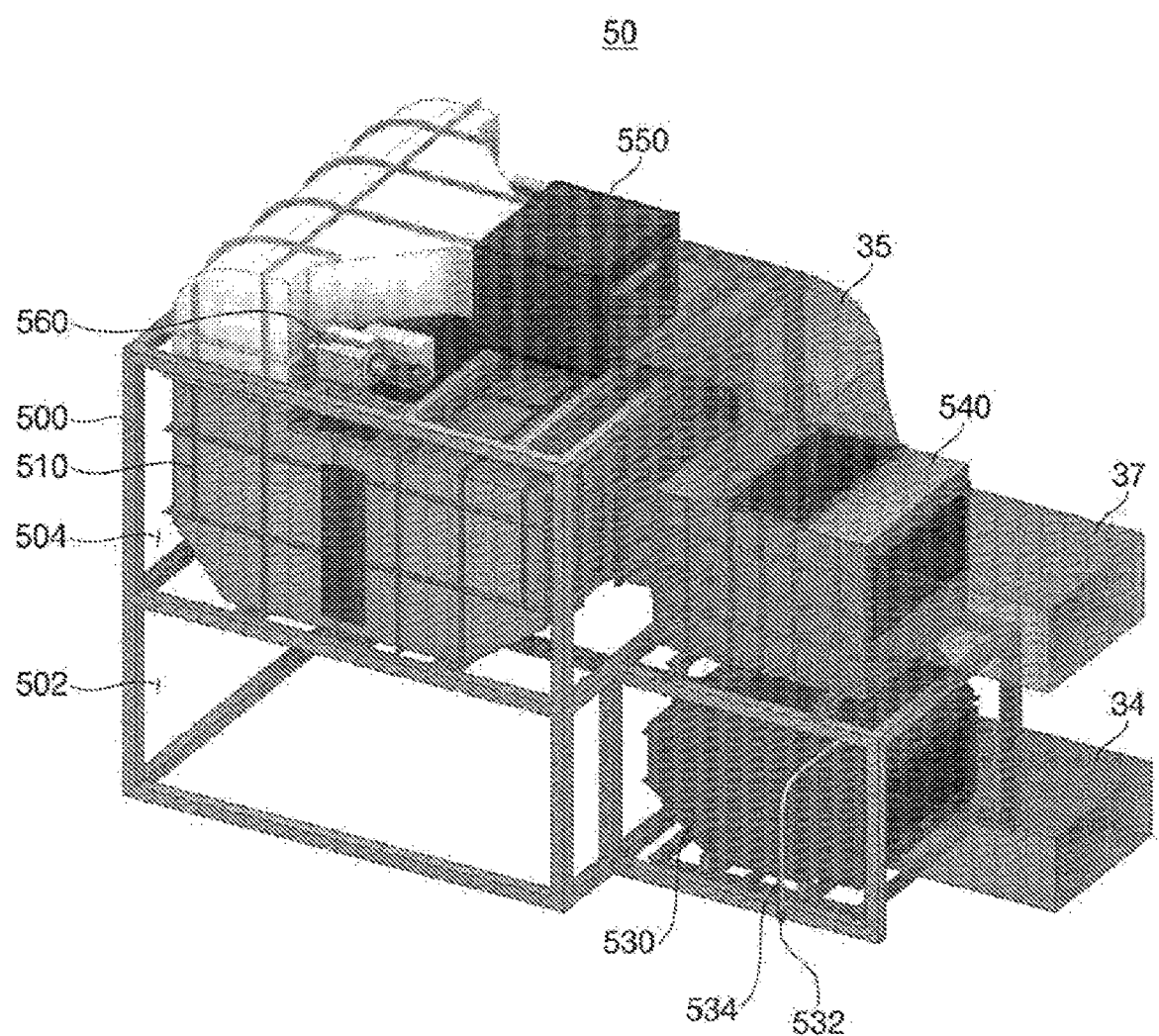
FIG. 10 illustrates a catalytic decomposition device in accordance with embodiments.
Figure 11:
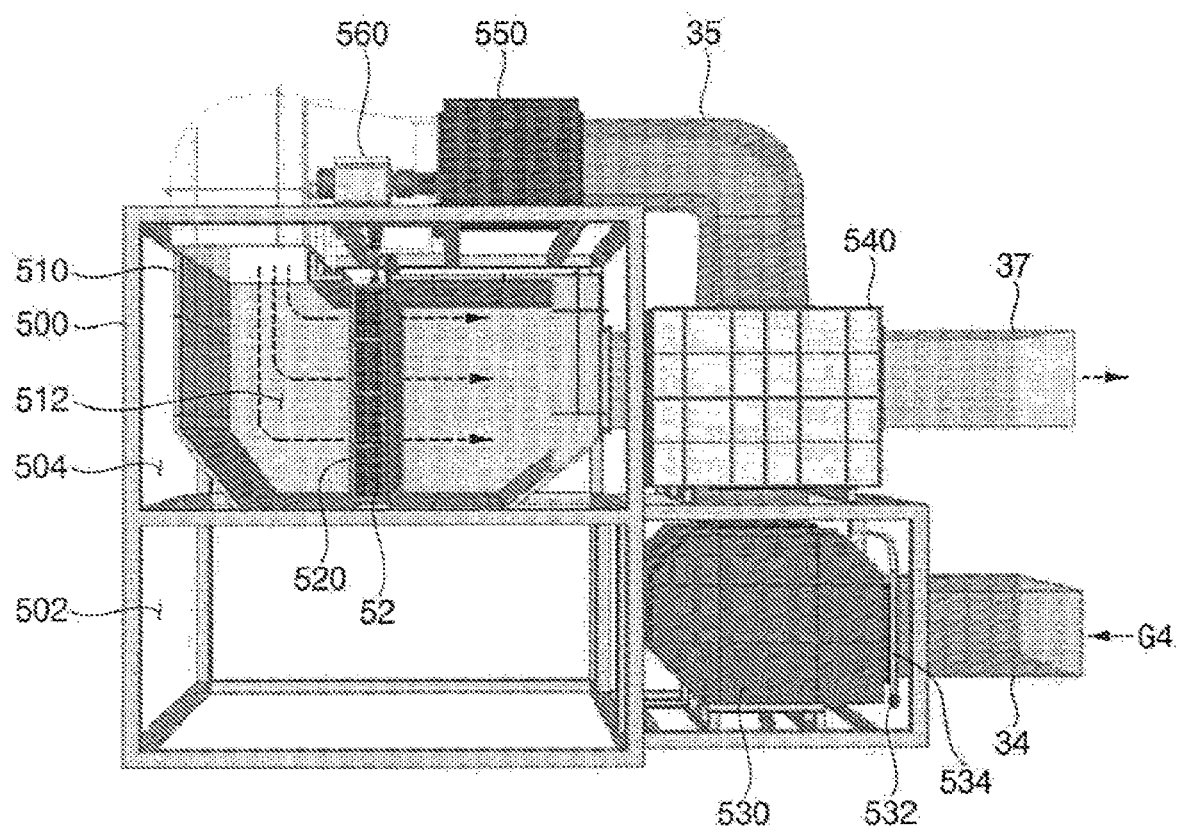
FIG. 11 is a side view of a catalytic decomposition device of FIG. 10.
Figure 12:
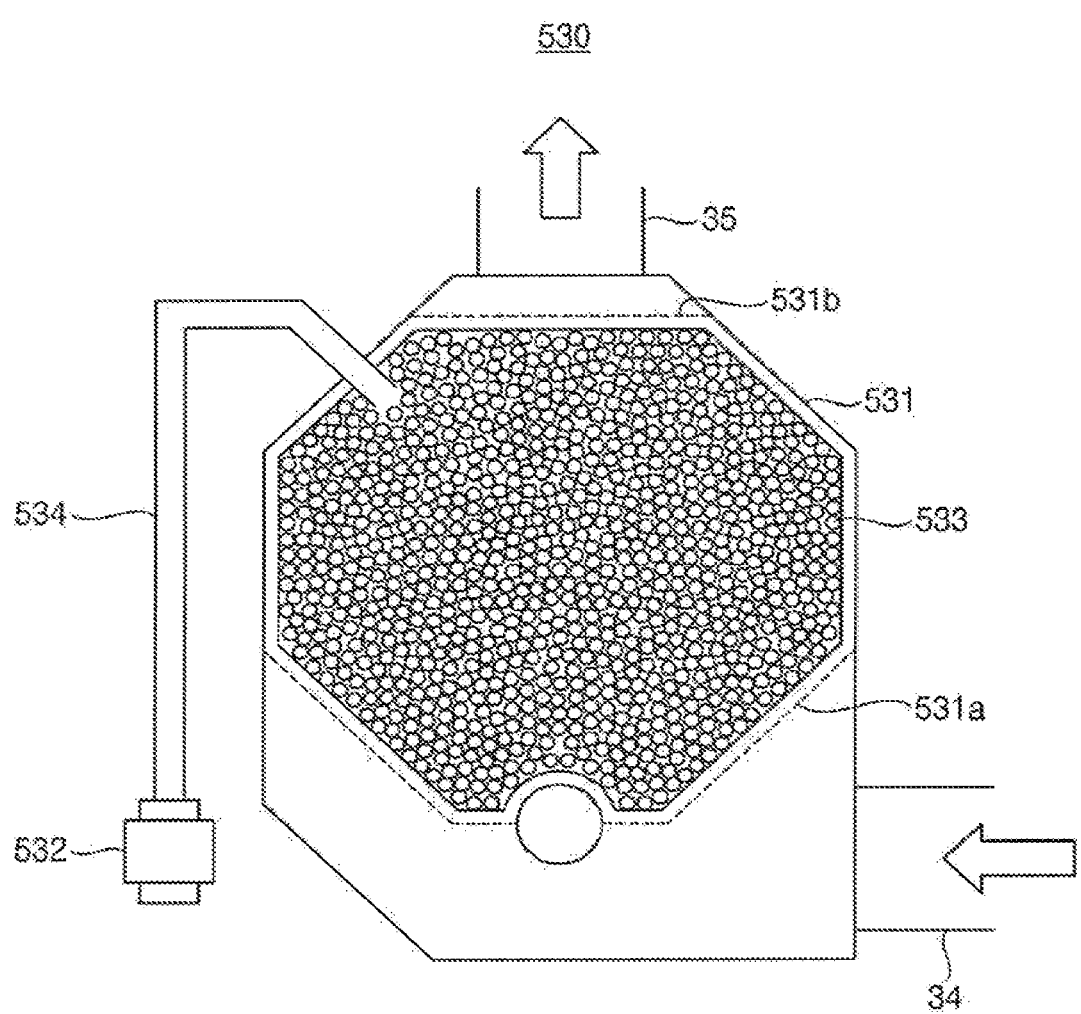
FIG. 12 is a cross-sectional view of a pretreatment portion in FIG. 10.
Figure 13:
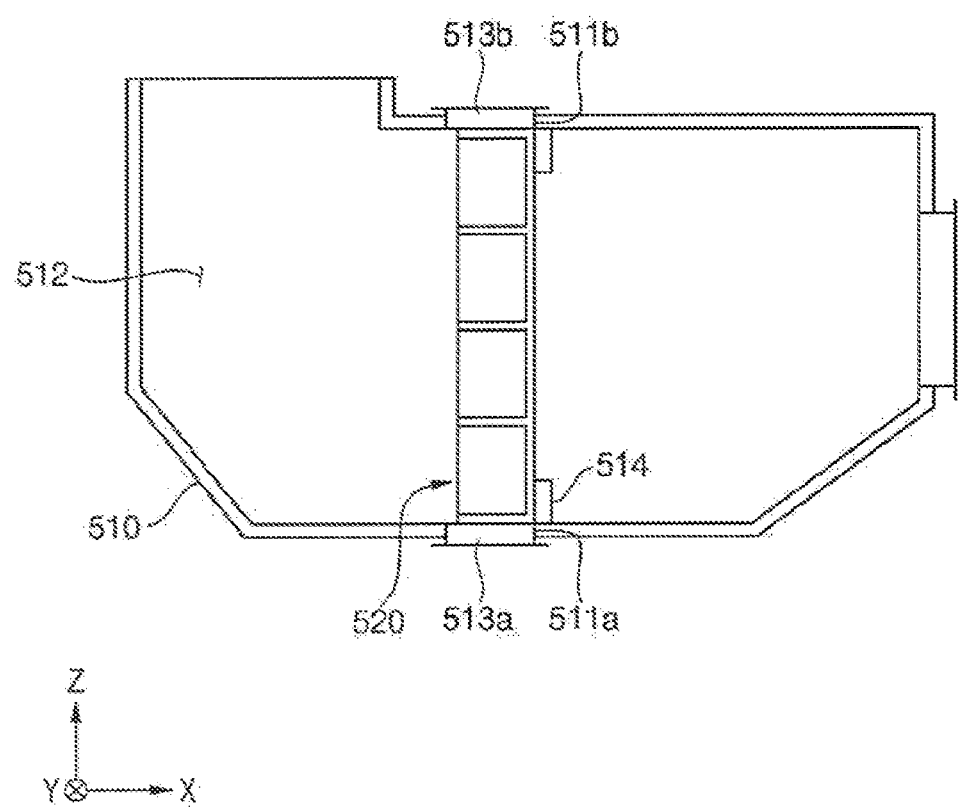
FIG. 13 is a cross-sectional view of a catalytic chamber of a catalytic decomposition apparatus of FIG. 10.
Figure 14:
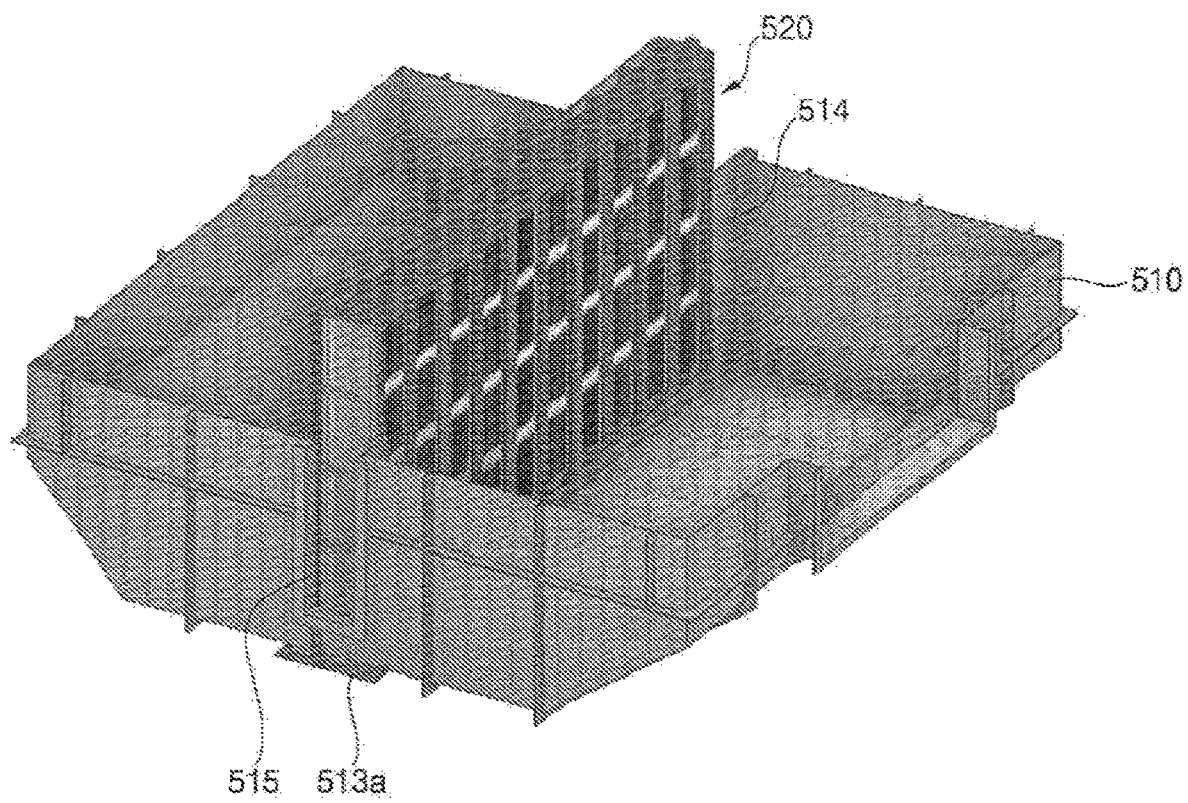
FIG. 14 is an exploded perspective view of a portion of a catalytic chamber of FIG. 13.
Figure 15:
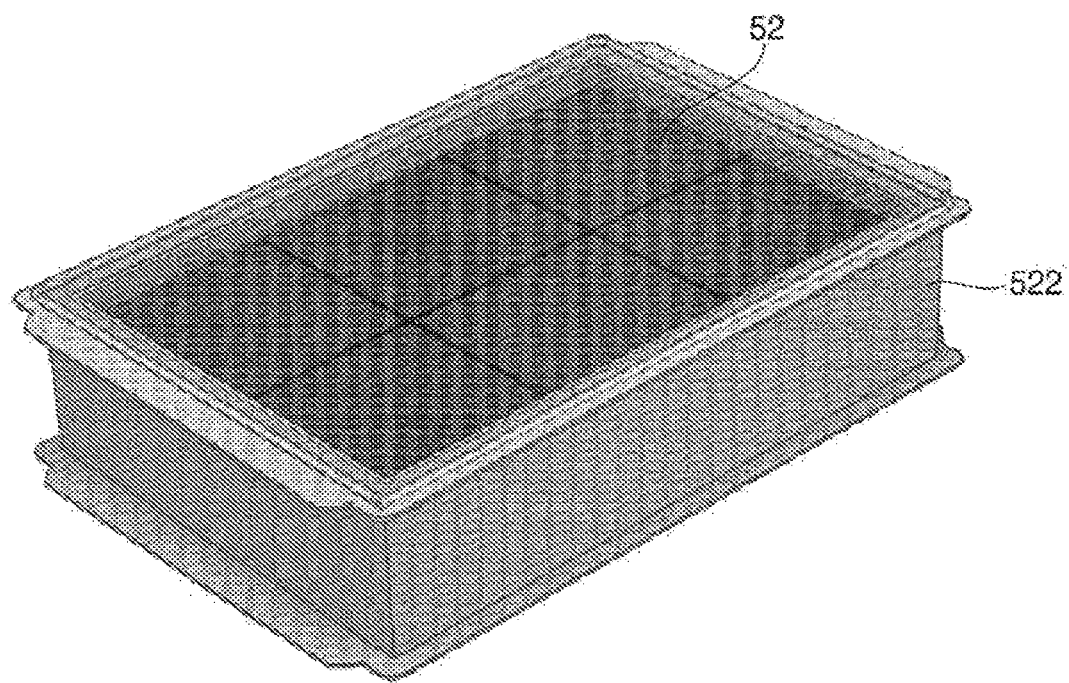
FIG. 15 is a perspective view of a catalyst block installed in a catalyst bed in FIG. 14.

FIG. 10 is a perspective view of a catalytic decomposition device in accordance with embodiments. FIG. 11 is a side view of a catalytic decomposition device of FIG. 10. FIG. 12 is a cross-sectional view of a pretreatment portion in FIG. 10. FIG. 13 is a cross-sectional view of a catalytic chamber of a catalytic decomposition apparatus of FIG. 10. FIG. 14 is an exploded perspective view of a portion of a catalytic chamber of FIG. 13. FIG. 15 is a perspective view of a catalyst block installed in a catalyst bed in FIG. 14.

Referring to FIGS. 10 to 15, in an embodiment, a catalytic decomposition device 50 includes a frame structure 500, a catalytic chamber 510 installed in the frame structure 500 and that provides a gas passage 512 through which a waste gas containing a first compound A1 and a second compound A2 flows, a catalyst bed 520 disposed in the gas passage 512 of the catalytic chamber 510 and that includes an oxidation-reduction catalyst 52 provided therein that removes the first and second compounds from the waste gas, and a lifting device 560 that withdraws the catalyst bed 520 from the catalytic chamber 510 to replace the oxidation-reduction catalyst 52. The catalytic decomposition device 50 further includes a pretreatment portion 530, a heat exchanger 540 and a heater 550.

In embodiments, the frame structure 500 is installed on a specific installation site, such as a roof top of a semiconductor manufacturing facility. A separate lower support that fixes the frame structure 500 to the roof may be further provided. The frame structure 500 provides a first space 502 in a lower level of the frame structure 500 and a second space 504 in an upper level of the frame structure and that is separated from the first space 502, where the upper level is above the lower level. The catalytic chamber 510 is installed in the second space 504 of the frame structure 500. As will be described below, after the lifting device 560 lowers the catalyst bed 520 through a lower opening 511*a* of the catalytic chamber 510 into the first space 502 of the lower level below the catalytic chamber 510, an operator on the ground replaces a catalyst block 522 mounted in the catalyst bed 520.

In embodiments, the pretreatment portion 530 includes a pretreatment chamber 531 disposed in a front end of the catalytic chamber 510 and that receives a pretreatment agent 533 that pre-adsorbs an adhesive material (catalyst poison) that reduces catalyst performance. The pretreatment agent 533 includes alumina ($Al_2O_3$) gel particles that adsorb and remove toxic catalyst components. The pretreatment chamber 531 is installed in the first space 502 of the frame structure 500. The pretreatment agent 533 has superior adsorption performance at a low temperature (room temperature) than a high temperature environment, and thus the pretreatment chamber 531 is disposed in front of the catalytic chamber 512 to minimize equipment size and improve adsorption performance of the pretreatment agent 533.

As illustrated in FIG. 12, the pretreatment chamber 531 includes an inlet portion 531*a* and an outlet portion 531*b* that face each other and provide an accommodation space for the pretreatment agent 533. The inlet portion 531*a* is in communication with a third exhaust line 34 so that a gas G4 desorbed from the adsorption/desorption device 40 is introduced. The inlet portion 531*a* and the outlet portion 531*b* each have a mesh shape to allow gas to flow therethrough.

The pretreatment agent 533 requires periodic replacement due to an irreversible adsorption (one-time) reaction. Since the pretreatment chamber 531 is separately located from the catalytic chamber 510, it can be replaced independently of the catalyst. The pretreatment portion 530 further includes an airflow-type conveying device 532 that is used to replace the pretreatment agent 533. The airflow-type conveying device 532 fills the pretreatment chamber 531 with the pretreatment agent 533 through a replacement pipe 534. For example, the airflow-type conveying device 532 includes an air-operated particle conveying device that uses a Venturi effect, such as a vacuum conveyor.

In embodiments, the heat exchanger 540 is installed in the second space 504 of the frame structure 500. The heat exchanger 540 is disposed above the pretreatment portion 530 and along a side of the catalytic chamber 510. The waste gas that has passed through the pretreatment portion 530 is introduced through the heat exchanger 540 into the catalytic chamber 510. The waste gas that has passed through the heat exchanger 540 is introduced through a first connection line 35 to the heater 550. The heater 550 is disposed between the heat exchanger 540 and the catalytic chamber 510 to heat the waste gas flowing into the catalytic chamber 510 to a temperature suitable for the catalyst reaction. For example, the waste gas flowing into the catalytic chamber 510 is heated to a temperature of 400° C. to 500° C.

As illustrated in FIGS. 13 to 15, the catalyst bed 520 is disposed in the gas passage 512 of the catalytic chamber 510, the catalyst blocks 522 are assembled and fixed to a catalyst bed frame in a lattice pattern, and the oxidation-reduction catalyst 52 is provided in each of a plurality of the catalyst blocks 522. A sealing member such as a gasket is provided on a rear surface of the catalyst bed frame and interposed between the catalyst bed 520 and the catalytic chamber, and a flange 514 is disposed inside the catalytic chamber 510. The catalyst bed 520 is compressed with the flange 514 and the sealing member and sealed between the catalyst bed 520 and sidewalls of the catalytic chamber 510.

As illustrated in FIGS. 3A to 3C, the oxidation-reduction catalyst 52 includes the catalyst body 54, which includes a plurality of passages through which the waste gas flows, and the carrier 56, which is coated on the catalyst body 54 and includes the first and second catalysts 58 and 59 therein.

When the gas G4 desorbed from the adsorption/desorption device 40 passes through the oxidation-reduction catalyst 52 of the catalyst bed 520, an organic compound (IPA) as the first compound and ammonia as the second compound in the desorbed gas G4 are removed. In particular, the organic compound and the ammonia are subjected to an oxidation treatment by the oxidation-reduction catalyst 52, and nitrogen oxides (NOx) generated by the oxidation treatment are removed by a selective reduction reaction.

The waste gas purified in the catalytic chamber 510 is discharged through a second connection line 36, a fourth exhaust line 37 and a fifth exhaust line 39 after passing through the heat exchanger 540. When the waste gas discharged from the catalytic chamber 510 passes through the heat exchanger 540, the overall thermal efficiency is improved through heat exchange with the waste gas that has passed through the pretreatment portion 530.

Hereinafter, a catalyst bed that is detachable from a catalytic chamber will be described in detail.

Figure 16A:
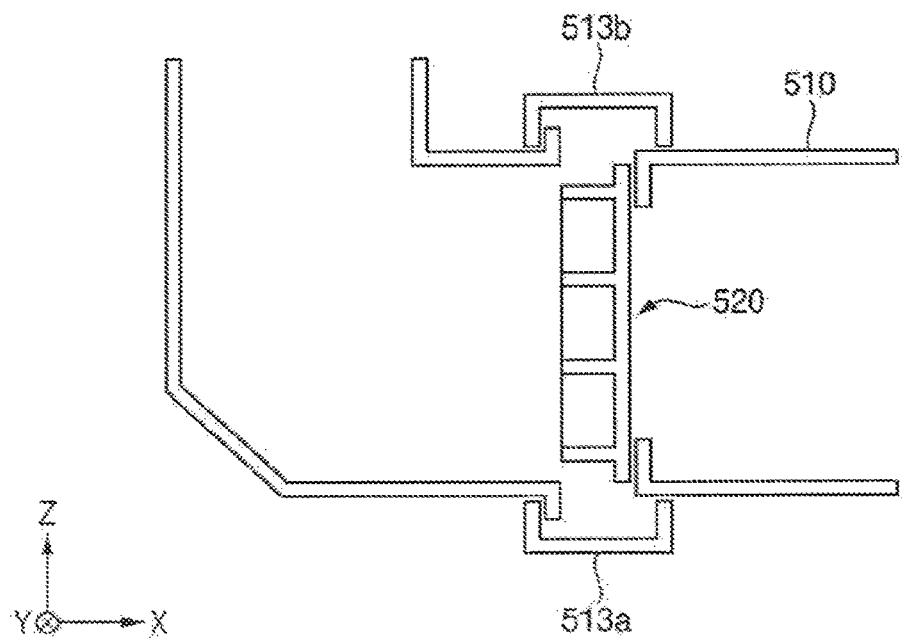
FIG. 16A is a cross-sectional view of a catalyst bed disposed in a catalytic chamber in FIG. 10.
Figure 16B:
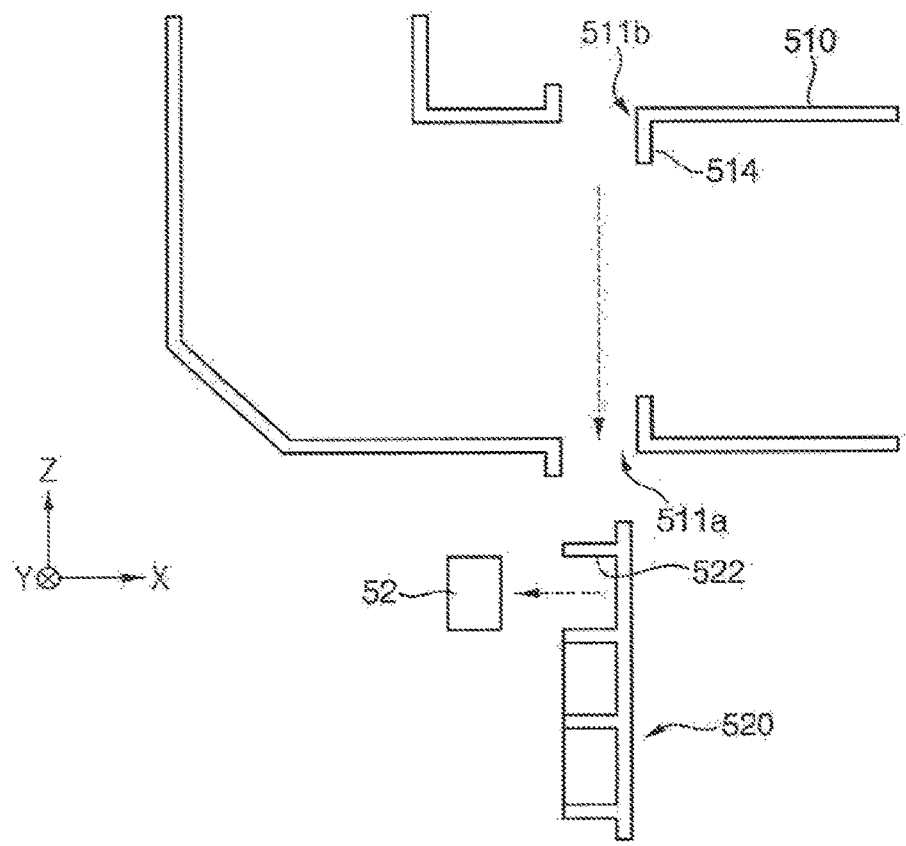
FIG. 16B is a cross-sectional view of a catalyst bed in a state in which the catalyst bed is separated and removed from a catalytic chamber in FIG. 10.

FIG. 16A is a cross-sectional view of a catalyst bed disposed in a catalytic chamber in FIG. 10, and FIG. 16B is a cross-sectional view of a catalyst bed when the catalyst bed is separated and removed from the catalytic chamber in FIG. 10.

Referring to FIGS. 16A and 16B, in an embodiment, a catalytic chamber 510 includes a lower opening 511*a* provided in a lower wall and an upper opening 511*b* provided in an upper wall that corresponds to and is vertically aligned with the lower opening 511*a*. The catalytic chamber 510 includes a lower cover 513*a* that covers the lower opening 511*a* and an upper cover 513*b* that covers the upper opening 511*b*. A sidewall opening 515 is provided in a sidewall of the catalytic chamber 510 to facilitate replacement of the catalyst bed 520.

As illustrated in FIG. 16A, in an embodiment, the catalyst bed 520 is disposed inside the catalytic chamber 510. The catalyst bed 520 is compressed with the flange 514 of the catalytic chamber 510 and sealed between the catalyst bed 520 and the sidewall of the catalytic chamber 510. The lower cover 513*a* and the upper cover 513*b* cover the lower opening 511*a* and the upper opening 511*b*, respectively. In addition, a sidewall cover 516, shown in FIG. 19A, covers the sidewall opening 515.

As illustrated in FIG. 16B, in an embodiment, the catalyst bed 520 can be separated and removed from the catalytic chamber 510. The lower cover 513*a* and the upper cover 513*b* are respectively removed, and the catalyst bed 520 is removed from the catalytic chamber 510 through the lower opening 511*a* of the catalytic chamber 510. The catalyst bed 520 is supported by a cable of the lifting device that extends through the upper opening 511a of the catalytic chamber 510.

Figure 17A:
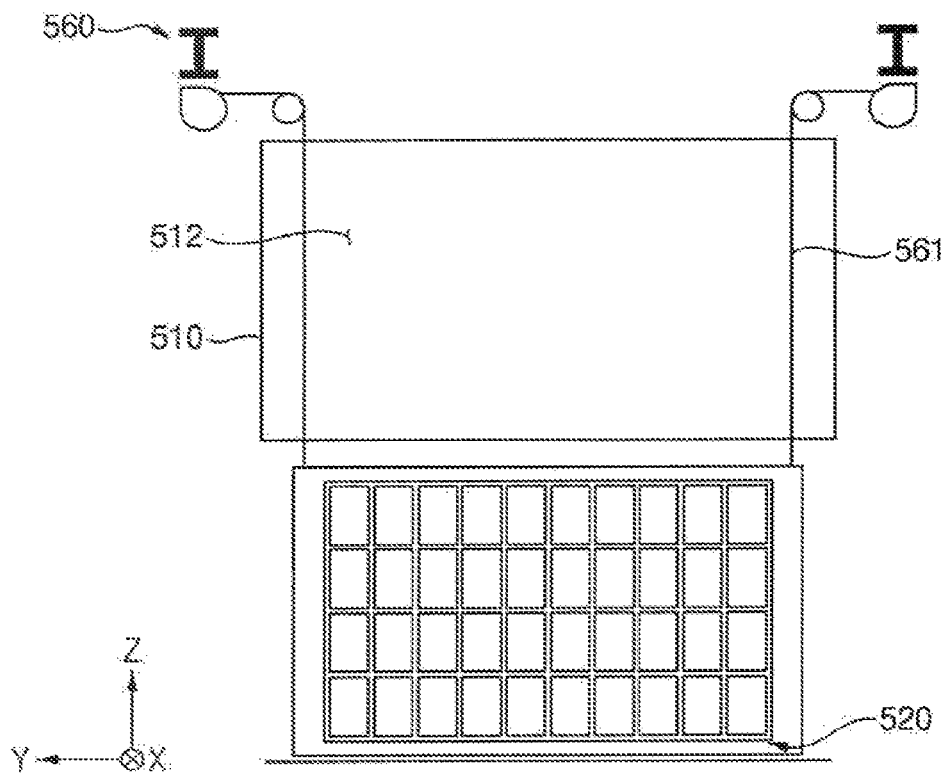
FIGS. 17A and 17B are side views of a hoist that moves a catalyst bed into and out of a catalytic chamber, in accordance with embodiments.
Figure 17B:
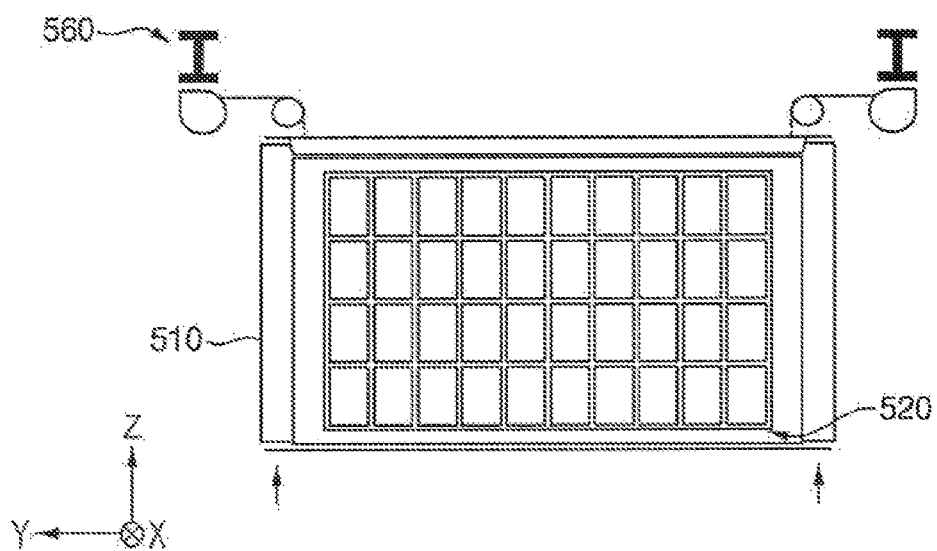

FIGS. 17A and 17B are side views of a hoist for moving the catalyst bed into and out of the catalytic chamber.

Referring to FIGS. 17A and 17B, in an embodiment, a lifting device 560 includes a hoist that includes a cable 561 that withdraws the catalyst bed 520 out of the catalytic chamber 510.

As illustrated in FIG. 17A, the catalyst bed 520 is lowered by the cable 561 into the lower space under the catalytic chamber 510 for catalyst replacement. As illustrated in FIG. 17B, after the catalyst replacement is completed, the catalyst bed 520 is raised into the catalytic chamber 510 by the hoist using the cable 561.

In an embodiment, the lifting device 560 includes a lifter that functions similar to the hoist. The lifter can raise and lower the catalyst bed 520 while supporting a lower portion of the catalyst bed 520. The catalytic chamber 510 does not have an upper opening.

Figure 18:
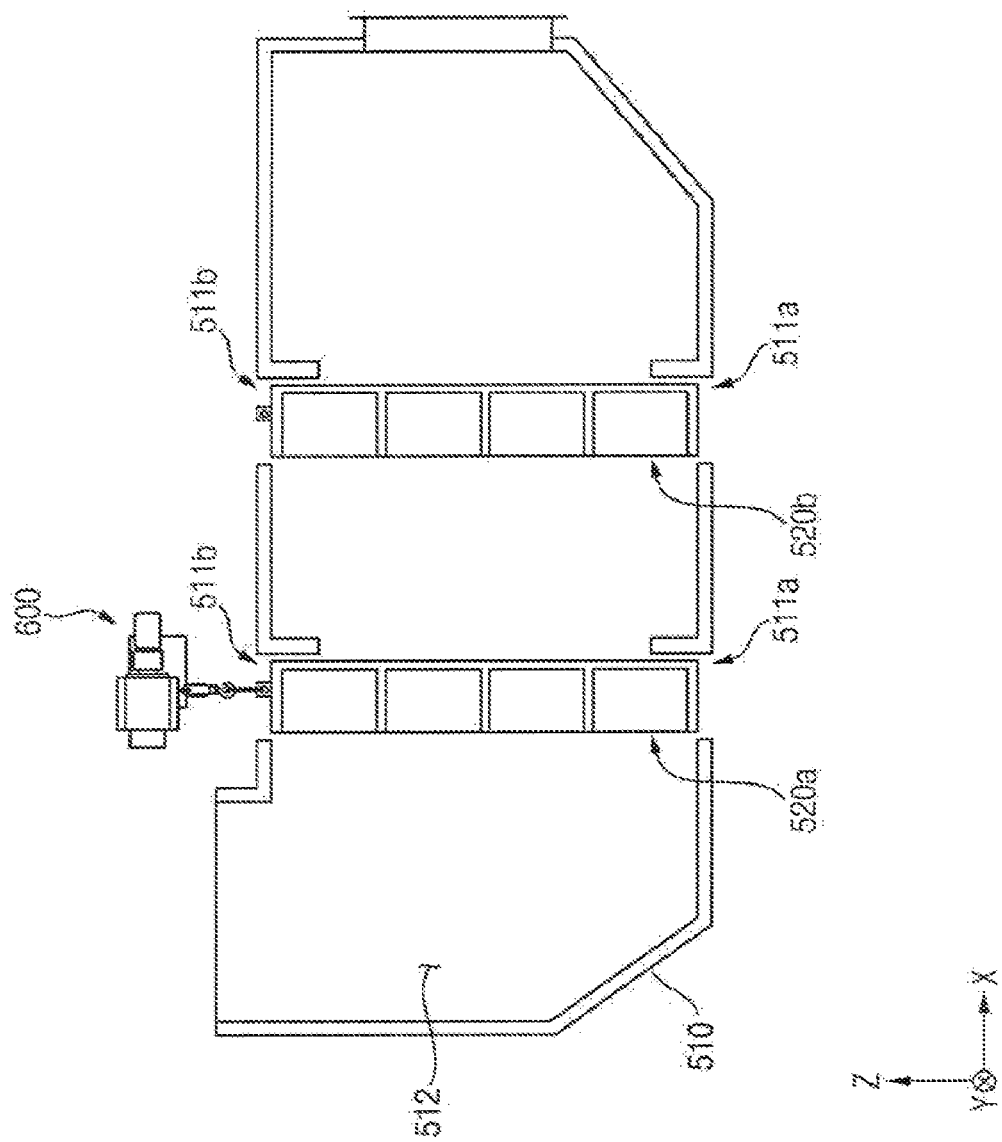
FIG. 18 is a cross-sectional view of a catalytic chamber of a catalytic decomposition device in accordance with embodiments.

FIG. 18 is a cross-sectional view of a catalytic chamber of a catalytic decomposition device in accordance with embodiments.

Referring to FIG. 18, in an embodiment, a catalytic decomposition device includes at least first and second catalyst beds 520a and 520b that are sequentially disposed in a catalytic chamber 510 and at least one lifting device 600 that can withdraw the first and second catalyst beds 520 from the catalytic chamber 510.

In embodiments, the first catalyst bed 520a and the second catalyst bed 520b are spaced apart from each other in a gas flow direction (X direction) in the catalytic chamber 510.

The catalytic chamber 510 includes two lower openings 511a provided in a lower wall and two upper openings 511b provided in an upper wall that respectively correspond to the lower openings 511a. In addition, the catalytic chamber 510 includes two lower covers that cover the lower openings 511a and two upper covers that cover the upper openings 511b.

The first catalyst bed 520a and the second catalyst bed 520b can be selectively removed from the catalytic chamber 510 by the lifting device 600 for catalyst replacement. Only one of the first catalyst bed 520a and the second catalyst bed 520b may be removed, or both of the first catalyst bed 520a and the second catalyst bed 520b may be removed. When both the first catalyst bed 520a and the second catalyst bed 520b are removed, the first catalyst bed 520a and the second catalyst bed 520b are spaced apart from each other in an open space outside the facility, so that an operator can freely access each bed.

Hereinafter, a catalyst replacement method of a catalytic decomposition device will be described.

FIGS. 19A to 19F illustrate a catalyst replacement method of a catalytic decomposition device, according to an embodiment.

Figure 19A:
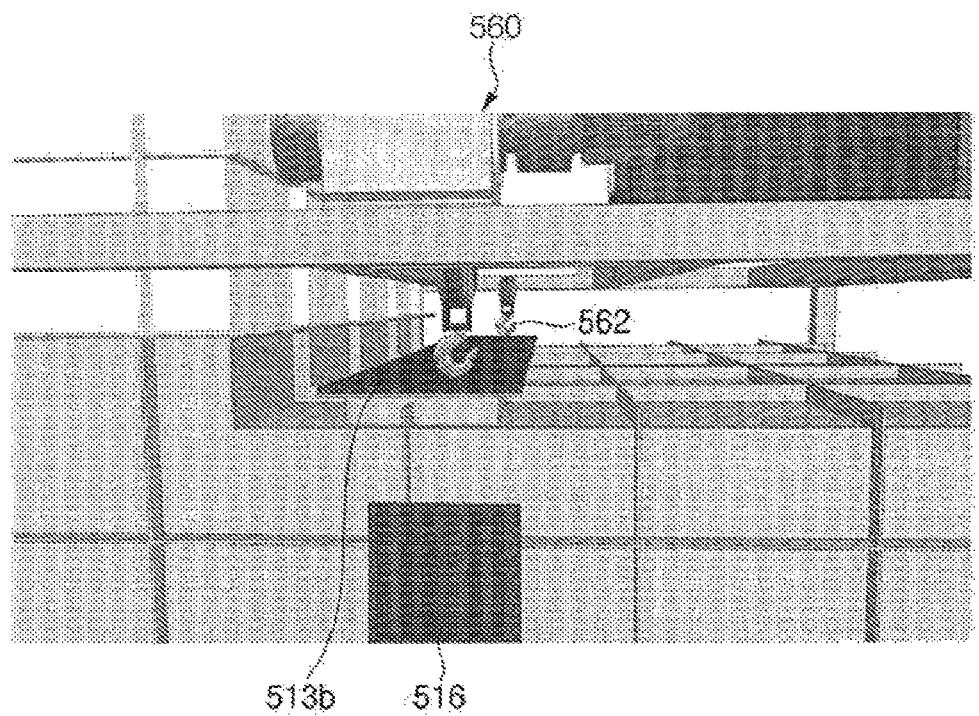
FIGS. 19A to 19F illustrate a catalyst replacement method of a catalytic decomposition device.
Figure 19B:
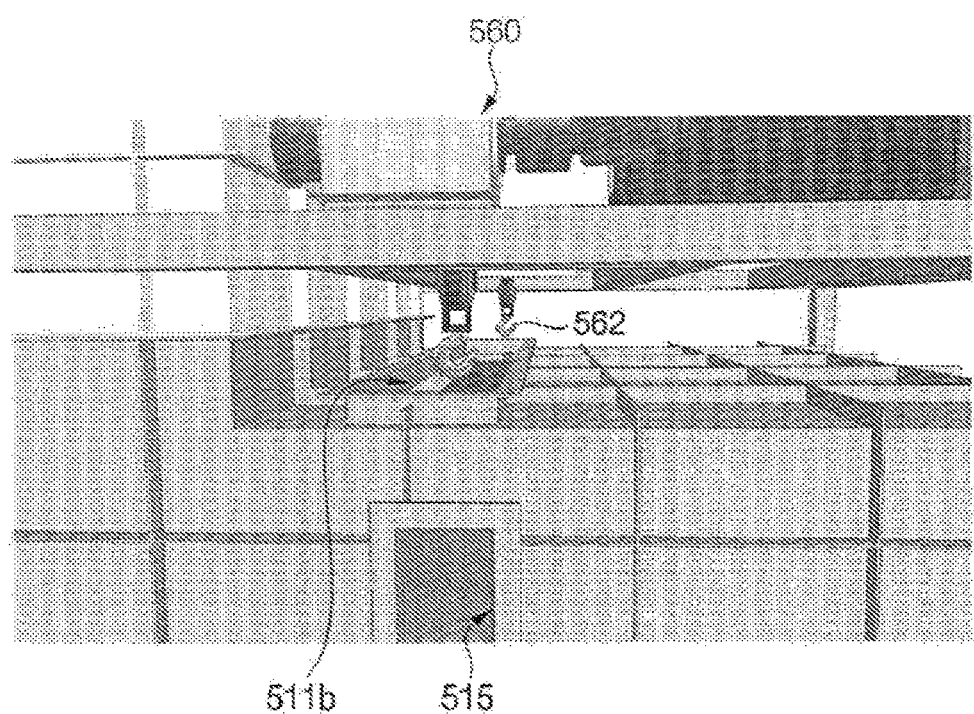
Figure 19C:
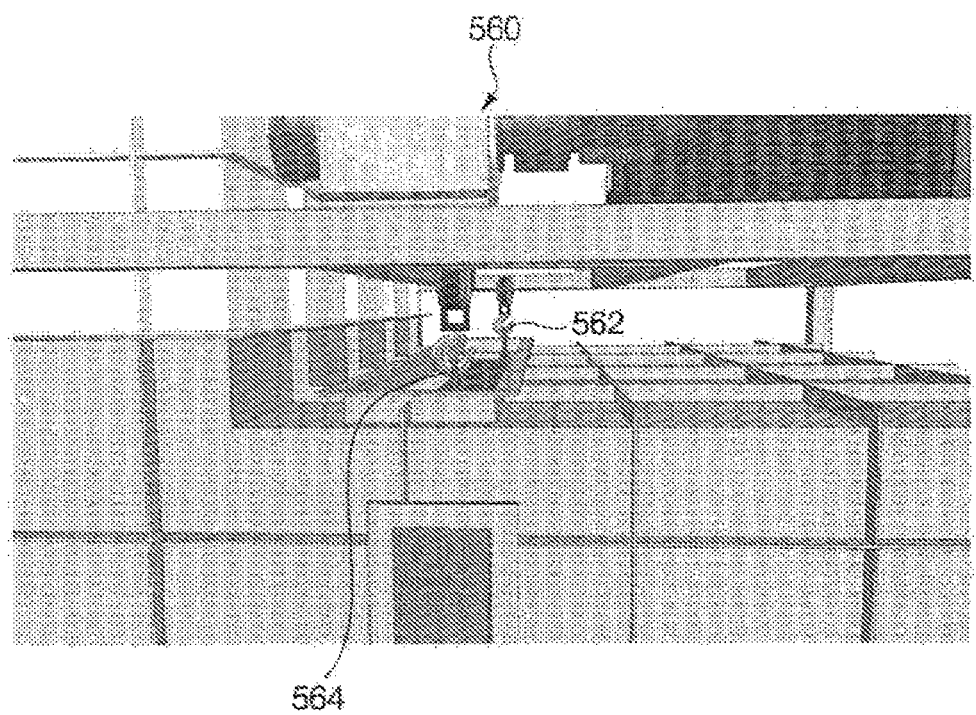

Referring to FIGS. 19A to 19C, a lifting device 560 is connected to a catalyst bed 520.

In embodiments, a lower cover 513a, an upper cover 513b and a sidewall cover 516 are removed from a catalytic chamber 510 and a fixing device of a catalyst bed 520 is released. Accordingly, an upper end of a frame of the catalyst bed 520 is exposed through an upper opening 511b.

Then, a hook 562 of the lifting device 560 is lowered and connected to a shackle 564 fixed to the upper end of the frame of the catalyst bed 520.

Figure 19D:
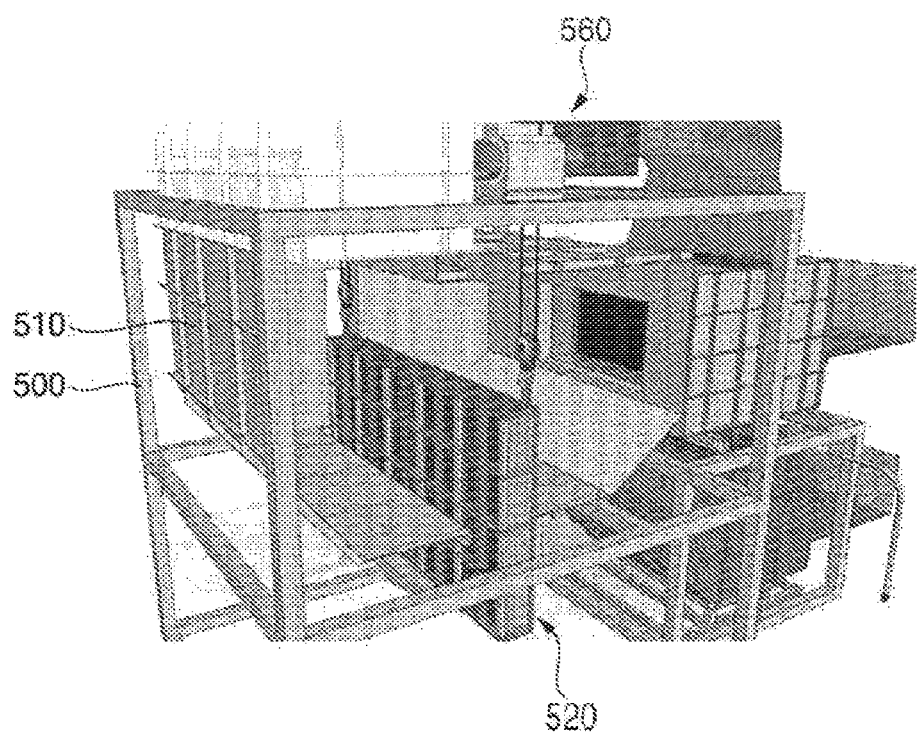
Figure 19E:
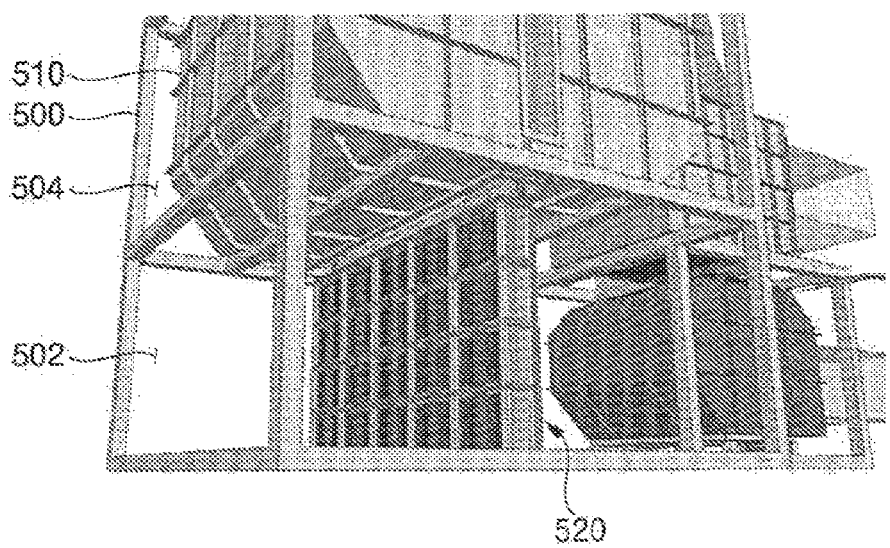

Referring to FIGS. 19D and 19E, the catalyst bed 520 is lowered to a space under the catalytic chamber 510 and then a catalyst installation or maintenance operation can be performed.

As the catalyst bed 520 is lowered by the lifting device 560, the catalyst bed 520 is moved into a first space 502 of a lower level through the lower opening 511a of the catalytic chamber 510. The catalyst bed 520 is supported in the first space 502 of a frame structure 500 under the catalytic chamber 510 by the lifting device 560 during catalyst replacement.

An operator can freely access the catalyst bed 520 outside the catalytic chamber 510 in the first space 502 of the frame structure 500 to replace a catalyst block 522. Accordingly, by performing the installation and maintenance of the catalyst outside the facility without the need to enter the facility, the stability of the operation can be ensured.

Figure 19F:
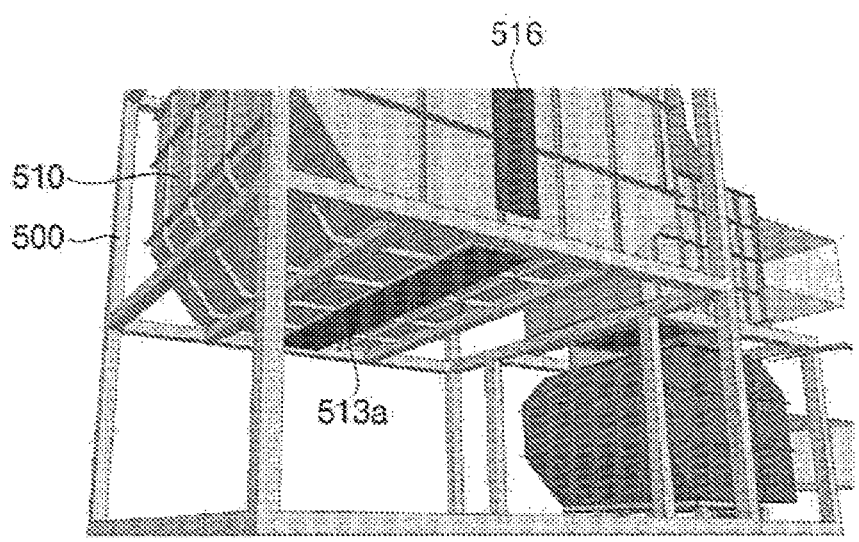

Referring to FIG. 19F, after installation or maintenance of the catalyst is performed, the catalyst bed 520 is moved back into the catalytic chamber 510.

As the catalyst bed 520 is raised by the lifting device 560, the catalyst bed 520 is lifted into the catalytic chamber 510 through the lower opening 511a of the catalytic chamber 510. The catalytic bed 520 is compressed with a flange 514 of the catalytic chamber 510 and sealed between the catalyst bed 520 and the sidewall of the catalytic chamber 510. The lower cover 513a and the upper cover 513b are respectively fastened to the lower opening 511a and the upper opening 511b. In addition, the sidewall cover 516 is also fastened to the sidewall opening 515.

As described above, the integrated waste gas treatment system 10 include the adsorption/desorption device 40 and the catalytic decomposition device 50 that are sequentially installed in the discharge line and through which a waste gas that includes an organic compound and an organic nitrogen compound is discharged from the emission source 20, such as a semiconductor manufacturing facility. The adsorption/desorption device 40 adsorbs the organic compound and the organic nitrogen compound and concentrates and desorbs them.

The catalytic decomposition device 50 includes the catalytic chamber 510 that provides the gas passage 512 through which the gas desorbed from the adsorption/desorption device 40 flows, and the oxidation-reduction catalyst 52 disposed in the gas passage 512 in the catalytic chamber 510 to remove the organic compound and the organic nitrogen compound from the desorbed gas. The organic compound and the organic nitrogen compound are subjected to oxidation treatment by the oxidation-reduction catalyst 52, and nitrogen oxides (NOx) generated by the oxidation treatment are removed by a selective reduction reaction.

The oxidation-reduction catalyst 52 includes a first catalytic material, such as Pt, that oxidizes the organic compound and the organic nitrogen compound by an oxidation catalytic function and a second catalytic material, such as Cu, that reduces nitrogen oxide (NOx) generated by the oxidation treatment by a reduction catalyst function.

The oxidation reaction rate of the organic compound, such as IPA, and the organic nitrogen compound, such as ammonia ($NH_3$), is increased by the first catalytic material. Accordingly, the oxidation reaction temperature of IPA and ammonia ($NH_3$) is lowered to a temperature of 400° C. to 500° C.

In addition, since the first catalytic material and the second catalytic material are present together on the same surface of the catalyst body of the catalytic decomposition device 50, nitrogen oxides (NOx) generated by the oxidation reaction of ammonia ($NH_3$) is converted into nitrogen ($N_2$) by the reduction reaction that uses ammonia ($NH_3$) that is desorbed, supplied and discharged.

Thus, since an oxidation reaction can be induced at a lower temperature than the oxidation reaction temperature (800° C. or higher) of a conventional thermal oxidizing method, such as a direct combustion method, fuel consumption for combustion is reduced. Further, the cost for further treatment of secondary products, such as nitrogen oxides (NOx) generated when ammonia ($NH_3$) is oxidized using the conventional general oxidation catalyst, is reduced.

Further, the catalytic decomposition device 50 includes the frame structure 500 that provides the first space 502 and the second space 504 that are separated into a lower level and an upper level, the catalytic chamber 510 installed in the second space 504 of the catalytic chamber 510 and that provides the gas passage 512 through which the gas desorbed from the adsorption/desorption device 40 flows, the catalyst bed 520 disposed in the gas passage 512 of the catalytic chamber 510 and that includes the oxidation-reduction catalyst 52 that removes the organic compound and the organic nitrogen compound from the desorbed gas, and the lifting device 560 that can withdraw the catalyst bed 520 into the first space 502 below the catalytic chamber 510.

As the catalyst bed 520 is lowered by the lifting device 560, the catalyst bed 520 moves into the first space 502 of the lower level through the lower opening 511$a$ of the catalytic chamber 510. The catalyst bed 520 is supported in the first space 502 of the frame structure 500 below the catalytic chamber 510 by the lifting device 560 during catalyst replacement.

An operator can freely access the catalyst bed 520 in the first space 502 of the frame structure 500 outside the catalytic chamber 510 to replace the catalyst block 522. Accordingly, by performing the installation and maintenance of the catalyst outside the facility without the need to enter the existing facility, the stability of the operation is ensured.

Semiconductor devices manufactured by an above-described semiconductor manufacturing facility include semiconductor devices such as logic devices or memory devices. The logic devices include central processing units (CPUs), main processing units (MPUs), or application processors (APs), etc., and the memory devices include volatile memory devices such as DRAM devices, HBM (high bandwidth memory) devices, or non-volatile memory devices such as flash memory devices, PRAM devices, MRAM devices, ReRAM devices, ETC.

The foregoing is illustrative of embodiments and is not to be construed as limiting thereof. Although a few embodiments have been described, those skilled in the art will readily appreciate that many modifications are possible in embodiments without materially departing from the novel teachings and advantages of the present invention. Accordingly, all such modifications are intended to be included within the scope of embodiments as defined in the claims.

What is claimed is:

1. An integrated waste gas treatment system, comprising:
   an adsorption/desorption device configured to:
   receive a waste gas that includes an organic compound and ammonia exhausted from a semiconductor manufacturing facility,
   adsorb the organic compound and the ammonia, and
   concentrate and desorb the organic compound and the ammonia; and
   a catalytic decomposition device disposed adjacent to the adsorption/desorption device,
   wherein the catalytic decomposition device includes:
   a catalytic chamber having a gas passage through which a gas desorbed from the adsorption/desorption device flows; and
   an oxidation-reduction catalyst disposed in the gas passage and configured to remove the organic compound and the ammonia from the desorbed gas,
   wherein the catalytic decomposition device is configured such that the organic compound and the ammonia are subjected to an oxidation treatment by the oxidation-reduction catalyst, and nitrogen oxides (NOx) generated by the oxidation treatment are removed by a selective reduction reaction.

2. The integrated waste gas treatment system of claim 1, wherein the adsorption/desorption device includes a honeycomb support through which the waste gas passes and an adsorption layer coated on a surface of the support, and the adsorption layer includes at least one of zeolite, alumina ($Al_2O_3$), porous silica ($SiO_2$) or a carbon-based adsorbent.

3. The integrated waste gas treatment system of claim 1, wherein the oxidation-reduction catalyst includes:
   a first catalytic material that oxidizes the organic compound and the ammonia by an oxidation catalyst function; and
   a second catalytic material that reduces nitrogen oxides (NOx) generated by the oxidation treatment by a reduction catalyst function.

4. The integrated waste gas treatment system of claim 3, wherein the first catalytic material includes at least one of platinum (Pt), palladium (Pd), rhodium (Rh), iridium (Ir), ruthenium (Ru), silver (Ag) or gold (Au), and the second catalytic material includes at least one of copper (Cu), iron (Fe), cerium (Ce), cobalt (Co), zinc (Zn), zirconium (Zr), manganese (Mn), vanadium (V), titanium (Ti), nickel (Ni), chromium (Cr) or molybdenum (Mo).

5. The integrated waste gas treatment system of claim 3, wherein the oxidation-reduction catalyst includes a catalyst body installed in the gas passage and that includes a plurality of passages through which the waste gas flows, and a carrier coated on the catalyst body and that includes the first and second catalytic materials.

6. The integrated waste gas treatment system of claim 5, wherein the carrier includes first and second carrier layers sequentially stacked on the catalyst body.

7. The integrated waste gas treatment system of claim 6, wherein the first carrier layer includes the first catalytic material and the second carrier layer includes the second catalytic material.

8. The integrated waste gas treatment system of claim 1, wherein the catalytic decomposition device includes:
   a frame structure that includes a first space in a lower level of the frame structure and a second space in an upper level of the frame structure, wherein the catalytic chamber is installed in the second space of the frame structure;
   a catalyst bed disposed in the gas passage of the catalytic chamber and that includes a plurality of catalyst blocks assembled into a lattice pattern, wherein the oxidation-reduction catalyst is provided in each of the plurality of catalyst blocks; and
   a lifting device that moves the catalyst bed from the catalytic chamber to the first space under the catalytic chamber.

9. The integrated waste gas treatment system of claim 8, wherein the catalytic chamber includes a lower opening in a lower wall and an upper opening in an upper wall that is vertically aligned with the lower opening, and the catalyst bed is movable to the first space below the catalytic chamber through the lower opening of the catalytic chamber.

10. The integrated waste gas treatment system of claim 9, wherein the catalyst bed in the first space is supported by a cable of the lifting device, wherein the cable extends through the upper opening of the catalytic chamber.

11. A catalytic decomposition device, comprising:
a frame structure that includes a first space in a lower level of the frame structure and a second space in an upper level of the frame structure;
a catalytic chamber installed in the second space of the frame structure and that includes a gas passage through which flows a waste gas that includes an organic compound and ammonia exhausted from a semiconductor manufacturing facility;
a catalyst bed disposed in the gas passage of the catalytic chamber and that includes a plurality of catalyst blocks assembled in a lattice pattern;
an oxidation-reduction catalyst disposed in each of the plurality of catalyst blocks and configured to remove the organic compound and the ammonia from the waste gas; and
a lifting device configured to move the catalyst bed from the catalytic chamber to the first space under the catalytic chamber.

12. The catalytic decomposition device of claim 11, wherein the organic compound and the ammonia are subjected to an oxidation treatment by the oxidation-reduction catalyst, and nitrogen oxides (NOx) generated by the oxidation treatment are removed by a selective reduction reaction.

13. The catalytic decomposition device of claim 12, wherein the oxidation-reduction catalyst includes:
a first catalytic material that oxidizes the organic compound and the ammonia by an oxidation catalyst function; and
a second catalytic material that reduces nitrogen oxides (NOx) generated by the oxidation treatment by a reduction catalyst function.

14. The catalytic decomposition device of claim 11, wherein the catalytic chamber includes a lower opening in a lower wall and an upper opening in an upper wall that is vertically aligned with the lower opening, and
the catalyst bed is movable to the first space below the catalytic chamber through the lower opening of the catalytic chamber.

15. The catalytic decomposition device of claim 14, wherein the catalyst bed in the first space is supported by a cable of the lifting device, wherein the cable extends through the upper opening of the catalytic chamber.

16. The catalytic decomposition device of claim 14, wherein the catalytic chamber includes a lower cover that covers the lower opening and an upper cover that covers the upper opening.

17. The catalytic decomposition device of claim 11, further comprising:
a pretreatment chamber disposed in a first end of the catalytic chamber and that receives a pretreatment agent that adsorbs an adhesive material that reduces catalyst performance.

18. The catalytic decomposition device of claim 17, further comprising:
a heat exchanger configured to exchange heat between waste gas that has passed through the pretreatment chamber and waste gas that has passed through the catalytic chamber.

19. The catalytic decomposition device of claim 18, wherein the pretreatment chamber is installed in the first space of the frame structure, and the heat exchanger is installed in the second space of the frame structure, above the pretreatment chamber and in a side of the catalytic chamber.

20. The catalytic decomposition device of claim 18, further comprising:
a heater disposed between the heat exchanger and the catalytic chamber and that heats the waste gas flowing into the catalytic chamber to a predetermined temperature that is suitable for a catalyst reaction.

* * * * *